US012743783B2

(12) United States Patent
Hwang et al.

(10) Patent No.: US 12,743,783 B2
(45) Date of Patent: Sep. 22, 2026

(54) GENERATING IMPROVED PANOPTIC SEGMENTED DIGITAL IMAGES BASED ON PANOPTIC SEGMENTATION NEURAL NETWORKS THAT UTILIZE EXEMPLAR UNKNOWN OBJECT CLASSES

(71) Applicant: Adobe Inc., San Jose, CA (US)

(72) Inventors: Jaedong Hwang, Seoul (KR); Seoung Wug Oh, San Jose, CA (US); Joon-Young Lee, Miliptas, CA (US)

(73) Assignee: Adobe Inc., San Jose, CA (US)

( * ) Notice: Subject to any disclaimer, the term of this patent is extended or adjusted under 35 U.S.C. 154(b) by 401 days.

(21) Appl. No.: 18/487,453

(22) Filed: Oct. 16, 2023

(65) Prior Publication Data

US 2024/0037750 A1 Feb. 1, 2024

Related U.S. Application Data

(63) Continuation of application No. 17/319,979, filed on May 13, 2021, now Pat. No. 11,803,971.

(51) Int. Cl.

*G06T 7/11* (2017.01)
*G06F 18/2413* (2023.01)
*G06V 10/40* (2022.01)

(52) U.S. Cl.

CPC .......... *G06T 7/11* (2017.01); *G06F 18/24137* (2023.01); *G06V 10/40* (2022.01); *G06T 2207/20084* (2013.01)

(58) Field of Classification Search

CPC ............. G06T 7/11; G06T 2207/20084; G06F 18/24137; G06V 10/40; G06V 10/762; G06V 10/774; G06V 10/82

See application file for complete search history.

(56) References Cited

U.S. PATENT DOCUMENTS 11,055,566 B1 7/2021 Pham et al.
11,176,384 B1 11/2021 Yang et al.
(Continued)

FOREIGN PATENT DOCUMENTS

EP 3985551 A1 * 4/2022 ............... G06T 7/11
EP 4138039 A2 * 2/2023 ............ G06N 20/20

OTHER PUBLICATIONS

Abhijit Bendale and Terrance E Boult. Towards open set deep networks. In CVPR, 2016.
(Continued)

*Primary Examiner* — Mia M Thomas
(74) *Attorney, Agent, or Firm* — Keller Preece PLLC

(57) ABSTRACT

This disclosure describes one or more implementations of a panoptic segmentation system that generates panoptic segmented digital images that classify both known and unknown instances of digital images. For example, the panoptic segmentation system builds and utilizes a panoptic segmentation neural network to discover, cluster, and segment new unknown object subclasses for previously unknown object instances. In addition, the panoptic segmentation system can determine additional unknown object instances from additional digital images. Moreover, in some implementations, the panoptic segmentation system utilizes the newly generated unknown object subclasses to refine and tune the panoptic segmentation neural network to improve the detection of unknown object instances in input digital images.

20 Claims, 16 Drawing Sheets

(56) References Cited

U.S. PATENT DOCUMENTS

| | | | | |
|---|---|---|---|---|
| 11,417,097 | B2 | 8/2022 | Lin et al. | |
| 11,562,490 | B2 | 1/2023 | Homayounfar et al. | |
| 11,587,234 | B2 | 2/2023 | Zhao et al. | |
| 2017/0206431 | A1 | 7/2017 | Sun et al. | |
| 2019/0244060 | A1* | 8/2019 | Dundar | G06V 10/82 |
| 2019/0347804 | A1* | 11/2019 | Kim | G06N 3/08 |
| 2020/0082219 | A1 | 3/2020 | Li | |
| 2021/0026355 | A1* | 1/2021 | Chen | G06F 18/23 |
| 2021/0150230 | A1 | 5/2021 | Smolyanskiy et al. | |
| 2021/0158043 | A1 | 5/2021 | Hou et al. | |
| 2021/0263962 | A1 | 8/2021 | Chang et al. | |
| 2021/0319236 | A1* | 10/2021 | Tang | G05D 1/243 |
| 2021/0326638 | A1 | 10/2021 | Lee et al. | |
| 2021/0326656 | A1 | 10/2021 | Lee et al. | |
| 2021/0358127 | A1 | 11/2021 | Jagadeesh et al. | |
| 2021/0366128 | A1 | 11/2021 | Kim et al. | |
| 2021/0397876 | A1 | 12/2021 | Hemani et al. | |
| 2022/0230321 | A1 | 7/2022 | Zhao et al. | |
| 2022/0264149 | A1* | 8/2022 | Lee | H04N 19/11 |
| 2022/0309762 | A1 | 9/2022 | Zhao et al. | |
| 2022/0375090 | A1* | 11/2022 | Hwang | G06T 7/11 |
| 2022/0404504 | A1* | 12/2022 | Kim | G01S 17/66 |
| 2023/0063150 | A1* | 3/2023 | Tu | G06T 7/536 |
| 2023/0072731 | A1* | 3/2023 | Li | G01S 7/4808 |
| 2023/0154005 | A1* | 5/2023 | Borse | G06T 7/10<br>382/100 |
| 2023/0206525 | A1* | 6/2023 | Harikumar | G06T 7/11<br>382/173 |
| 2023/0259587 | A1* | 8/2023 | Lin | G06N 3/08 |
| 2023/0281824 | A1* | 9/2023 | Mei | G06V 20/70<br>345/419 |
| 2023/0334673 | A1* | 10/2023 | Rajan | G06V 10/26 |
| 2024/0404064 | A1* | 12/2024 | Nguyen | G06V 10/764 |
| 2025/0104249 | A1* | 3/2025 | Lee | G06V 10/82 |

OTHER PUBLICATIONS

Adam Paszke, Sam Gross, Francisco Massa, Adam Lerer, James Bradbury, Gregory Chanan, Trevor Killeen, Zeming Lin, Natalia Gimelshein, Luca Antiga, et al. Pytorch: An imperative style, high-performance deep learning library. In NeurIPS, 2019.

Akshay Dhamija, Manuel Gunther, Jonathan Ventura, and Terrance Boult. The overlooked elephant of object detection: Open set. In WACV, 2020.

Alexander Kirillov, Kaiming He, Ross Girshick, Carsten Rother, and Piotr Dollar. Panoptic segmentation. In CVPR, 2019.

Alexander Kirillov, Ross Girshick, Kaiming He, and Piotr Dollar. Panoptic feature pyramid networks. In CVPR, 2019.

Ameya Prabhu, Philip HS Torr, and Puneet K Dokania. Gdumb: A simple approach that questions our progress in continual learning. In ECCV, 2020.

Bolei Zhou, Hang Zhao, Xavier Puig, Sanja Fidler, Adela Barriuso, and Antonio Torralba. Scene parsing through ade20k dataset. In CVPR, 2017.

Bowen Cheng, Maxwell D Collins, Yukun Zhu, Ting Liu, Thomas S Huang, Hartwig Adam, and Liang-Chieh Chen. Panoptic-deeplab: A simple, strong, and fast baseline for bottom-up panoptic segmentation. In CVPR, 2020.

Cheng-Yang Fu, Tamara L Berg, and Alexander C Berg. Imp: Instance mask projection for high accuracy semantic segmentation of things. In ICCV, 2019.

Christian Szegedy, Wei Liu, Yangqing Jia, Pierre Sermanet, Scott Reed, Dragomir Anguelov, Dumitru Erhan, Vincent Vanhoucke, and Andrew Rabinovich. Going deeper with convolutions. In CVPR, 2015.

Daniel Bolya, Chong Zhou, Fanyi Xiao, and Yong Jae Lee. Yolact: Real-time instance segmentation. In CVPR, 2019.

Dimity Miller, Lachlan Nicholson, Feras Dayoub, and Niko Sunderhauf. Dropout sampling for robust object detection in open-set conditions. In ICRA, 2018.

Dong Gong, Lingqiao Liu, Vuong Le, Budhaditya Saha, Moussa Reda Mansour, Svetha Venkatesh, and Anton van den Hengel. Memorizing normality to detect anomaly: Memory-augmented deep autoencoder for unsupervised anomaly detection. In ICCV, 2019.

Douglas L Medin and Marguerite M Schaffer. Context theory of classification learning. Psychological review, 85(3):207, 1978.

Gerhard Neuhold, Tobias Ollmann, Samuel Rota Bulo, and Peter Kontschieder. The mapillary vistas dataset for semantic understanding of street scenes. In ICCV, 2017.

Huanyu Liu, Chao Peng, Changqian Yu, Jingbo Wang, Xu Liu, Gang Yu, and Wei Jiang. An end-to-end network for panoptic segmentation. In CVPR, 2019.

Huiyu Wang, Yukun Zhu, Bradley Green, Hartwig Adam, Alan Yuille, and Liang-Chieh Chen. Axial-deeplab: Stand-alone axial-attention for panoptic segmentation. In ECCV, 2020.

Hyeonwoo Noh, Seunghoon Hong, and Bohyung Han. Learning deconvolution network for semantic segmentation. In ICCV, 2015.

Jake Snell, Kevin Swersky, and Richard Zemel. Prototypical networks for few-shot learning. In NeurIPS, 2017.

James MacQueen. Some methods for classification and analysis of multivariate observations. In Proceedings of the fifth Berkeley symposium on mathematical statistics and probability, vol. 1, pp. 281-297. Oakland, CA, USA, 1967.

Jin-Hwa Kim, Jaehyun Jun, and Byoung-Tak Zhang. Bilinear attention networks. In NeurIPS, 2018.

John Lambert, Zhuang Liu, Ozan Sener, James Hays, and Vladlen Koltun. Mseg: A composite dataset for multi-domain semantic segmentation. In CVPR, 2020.

Jonathan Long, Evan Shelhamer, and Trevor Darrell. Fully convolutional networks for semantic segmentation. In CVPR, 2015.

Joseph Redmon and Ali Farhadi. Yolo9000: better, faster, stronger. In CVPR, 2017.

Justin Lazarow, Kwonjoon Lee, Kunyu Shi, and Zhuowen Tu. Learning instance occlusion for panoptic segmentation. In CVPR, 2020.

Kaiming He, Georgia Gkioxari, Piotr Dollar, and Ross Girshick. Mask r-cnn. In ICCV, 2017.

Kaiming He, Xiangyu Zhang, Shaoqing Ren, and Jian Sun. Deep Residual Learning for Image Recognition. In CVPR, 2016.

Kelsey R Allen, Evan Shelhamer, Hanul Shin, and Joshua B Tenenbaum. Infinite mixture prototypes for few-shot learning. ICML, 2019.

Lawrence Neal, Matthew Olson, Xiaoli Fern, Weng-Keen Wong, and Fuxin Li. Open set learning with counterfactual images. In ECCV, 2018.

Lei Guo, Gang Xie, Xinying Xu, and Jinchang Ren. Exemplar-supported representation for effective class-incremental learning. IEEE Access, 8:51276-51284, 2020.

Li et al. "A Survey on Deep Learning Based Panoptic Segmentation" Digital Signal Processing 120, Oct. 12, 2021, pp. 1-20.

Liang-Chieh Chen, George Papandreou, Iasonas Kokkinos, Kevin Murphy, and Alan L Yuille. Deeplab: Semantic image segmentation with deep convolutional nets, atrous convolution, and fully connected crfs. TPAMI, 40(4):834-848, 2018.

Lorenzo Porzi, Samuel Rota Bulo, Aleksander Colovic, and Peter Kontschieder. Seamless scene segmentation. In CVPR, 2019.

Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In CVPR, 2016.

Michael McCloskey and Neal J Cohen. Catastrophic interference in connectionist networks: The sequential learning problem. In Psychology of learning and motivation, vol. 24, pp. 109-165. Elsevier, 1989.

Olga Russakovsky, Jia Deng, Hao Su, Jonathan Krause, Sanjeev Satheesh, Sean Ma, Zhiheng Huang, Andrej Karpathy, Aditya Khosla, Michael Bernstein, Alexander C. Berg, and Li Fei-Fei. ImageNet Large Scale Visual Recognition Chal-lenge. IJCV, 115(3):211-252, 2015.

Pramuditha Perera, Vlad I Morariu, Rajiv Jain, Varun Manjunatha, Curtis Wigington, Vicente Ordonez, and Vishal M Patel. Generative-discriminative feature representations for open-set recognition. In CVPR, 2020.

(56) References Cited

OTHER PUBLICATIONS

Priya Goyal, Piotr Dollar, Ross Girshick, Pieter Noordhuis, Lukasz Wesolowski, Aapo Kyrola, Andrew Tulloch, Yangqing Jia, and Kaiming He. Accurate, large mini-batch sgd: Training imagenet in 1 hour. arXiv preprint arXiv:1706.02677, 2017.
Qizhu Li, Anurag Arnab, and Philip HS Torr. Weakly-and semi-supervised panoptic segmentation. In ECCV, 2018.
Ranjay Krishna, Yuke Zhu, Oliver Groth, Justin Johnson, Kenji Hata, Joshua Kravitz, Stephanie Chen, Yannis Kalantidis, Li-Jia Li, David A Shamma, et al. Visual genome: Connecting language and vision using crowdsourced dense image annotations. IJCV, 123(1):32-73, 2017.
Robert M Nosofsky. Attention, similarity, and the identification-categorization relationship. Journal of experimental psychology: General, 115(1):39, 1986.
Ross Girshick. Fast r-cnn. In CVPR, 2015.
Shaoan Xie, Zibin Zheng, Liang Chen, and Chuan Chen. Learning semantic representations for unsupervised domain adaptation. In ICML, 2018.
Shaoqing Ren, Kaiming He, Ross Girshick, and Jian Sun. Faster R-CNN: Towards real-time object detection with region proposal networks. In NeurIPS, 2015.
Sylvestre-Alvise Rebuffi, Alexander Kolesnikov, Georg Sperl, and Christoph H Lampert. icarl: Incremental classifier and representation learning. In CVPR, 2017.
Thomas Cover and Peter Hart. Nearest neighbor pattern classification. TIT, 13(1):21-27, 1967.
Tien-Ju Yang, Maxwell D Collins, Yukun Zhu, Jyh-Jing Hwang, Ting Liu, Xiao Zhang, Vivienne Sze, George Papandreou, and Liang-Chieh Chen. Deeperlab: Single-shot image parser. arXiv preprint arXiv:1902.05093, 2019.
Trung Pham, Vijay BG Kumar, Thanh-Toan Do, Gustavo Carneiro, and Ian Reid. Bayesian semantic instance segmentation in open set world. In ECCV, 2018.
Tsung-Yi Lin, Michael Maire, Serge Belongie, James Hays, Pietro Perona, Deva Ramanan, Piotr Dollar, and C Lawrence Zitnick. Microsoft coco: Common objects in context. In ECCV, 2014.
Tsung-Yi Lin, Piotr Dollar, Ross B Girshick, Kaiming He, Bharath Hariharan, and Serge J Belongie. Feature pyramid networks for object detection. In CVPR, 2017.
Walter J Scheirer, Anderson de Rezende Rocha, Archana Sapkota, and Terrance E Boult. Toward open set recognition. TPAMI, 35(7):1757-1772, 2012.
Walter J Scheirer, Lalit P Jain, and Terrance E Boult. Probability models for open set recognition. TPAMI, 36(11):2317-2324, 2014.
Xu Yang, Kaihua Tang, Hanwang Zhang, and Jianfei Cai. Auto-encoding scene graphs for image captioning. In CVPR, 2019.
Yanwei Li, Xinze Chen, Zheng Zhu, Lingxi Xie, Guan Huang, Dalong Du, and Xingang Wang. Attention-guided unified network for panoptic segmentation. In CVPR, 2019.
Yuwen Xiong, Renjie Liao, Hengshuang Zhao, Rui Hu, Min Bai, Ersin Yumer, and Raquel Urtasun. Upsnet: A unified panoptic segmentation network. In CVPR, 2019.
Yuxin Wu, Alexander Kirillov, Francisco Massa, Wan-Yen Lo, and Ross Girshick. Detectron2. https://github.com/facebookresearch/detectron2, 2019.
Zendel, et al. “Unifying Panoptic Segmentation for Autonomous Driving” IEEE/CVF Conference on Computer Vision and Pattern Recognition (CVPR), 2022, pp. 21351-21360.
Zhirong Wu, Yuanjun Xiong, Stella X Yu, and Dahua Lin. Unsupervised feature learning via non-parametric instance discrimination. In CVPR, 2018.
Zhou Yu, Jun Yu, Yuhao Cui, Dacheng Tao, and Qi Tian. Deep modular co-attention networks for visual question answering. In CVPR, 2019.
Ziwei Liu, Zhongqi Miao, Xiaohang Zhan, Jiayun Wang, Boqing Gong, and Stella X Yu. Large-scale long-tailed recognition in an open world. In CVPR, 2019.
U.S. Appl. No. 17/319,979, filed Mar. 30, 2023, Office Action.
U.S. Appl. No. 17/319,979, filed Jun. 14, 2023, Notice of Allowance.

* cited by examiner

316

GENERATING IMPROVED PANOPTIC SEGMENTED DIGITAL IMAGES BASED ON PANOPTIC SEGMENTATION NEURAL NETWORKS THAT UTILIZE EXEMPLAR UNKNOWN OBJECT CLASSES

CROSS-REFERENCE TO RELATED APPLICATIONS

The present application is a continuation of U.S. application Ser. No. 17/319,979, filed on May 13, 2021. The aforementioned application is hereby incorporated by reference in its entirety.

BACKGROUND

Recent years have seen significant improvements in hardware and software platforms for training and utilizing machine-learning models. For instance, several machine-learning methods have achieved promising performance in areas such as image editing. In particular, recent developments have been made with respect to classifying and segmenting object instances and semantic background portrayed in digital images—a process called panoptic segmentation. Notwithstanding these improvements, current systems continue to suffer from several problems with regard to the accuracy and flexibility of computing device operations, and in particular, with respect to open-set panoptic segmentation. As one example, while current panoptic segmentation systems can largely identify known objects and background type classes in images, they fail to detect and classify unknown objects. Often, the failure to detect and classify unknown objects causes the objects to be inaccurately grouped as part of a background class. These along with additional problems and issues exist in current systems that generate digital images based on panoptic image segmentation.

BRIEF SUMMARY

Implementations of the present disclosure provide benefits and/or solve one or more of the foregoing or other problems in the art with systems, non-transitory computer-readable media, and methods that accurately, flexibly, and efficiently generate and utilize a panoptic segmentation neural network to discover panoptic labels for both known and unknown classes in digital images. More specifically, in various implementations, the disclosed systems build a panoptic segmentation neural network that, in addition to classifying known objects and segments, discovers various unknown object instances within a first digital image set. When several similar unknown object instances are discovered, the disclosed systems can generate an unknown object subclass. Further, utilizing the newly created unknown object subclasses from a first digital image set, the disclosed systems can expand the unknown object subclasses by identifying additional similar unknown object instances in a second digital image set and adding those unknown object instances to the unknown object subclass as additional object exemplar instances. Moreover, in various implementations, the disclosed systems further build and tune the panoptic segmentation neural network to readily detect and classify otherwise unknown object instances from input digital images that belong to the newly discovered unknown object subclasses.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
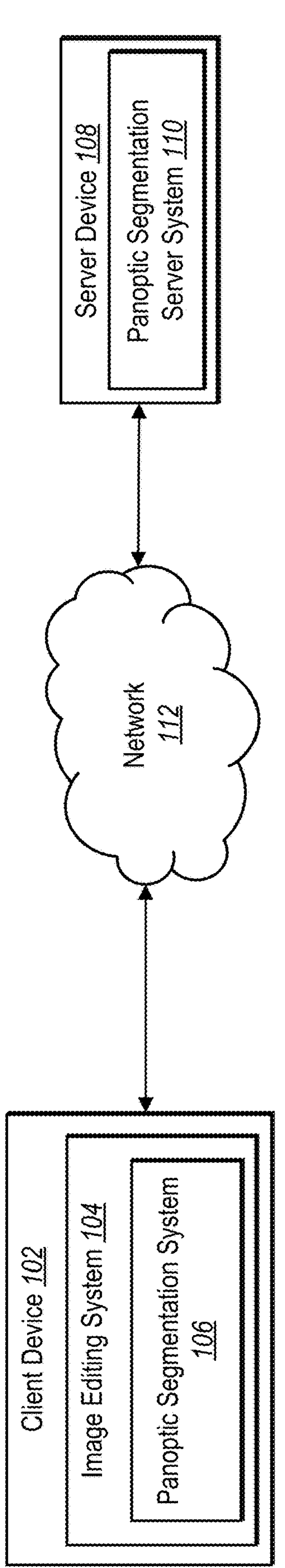
FIG. 1 illustrates a schematic diagram of a system environment in which a panoptic segmentation system operates in accordance with one or more implementations.

This disclosure describes one or more implementations of a panoptic segmentation system that generates panoptic segmented digital images that classify both known and unknown object instances of digital images. For example, in various implementations, the panoptic segmentation system builds and utilizes a panoptic segmentation neural network to discover object subclasses of unknown object instances. To illustrate, in various implementations, the panoptic segmentation system determines unknown object instances portrayed within a first set of digital images utilizing a panoptic segmentation neural network. Based on the unknown object instances, the panoptic segmentation system can generate various clusters of related unknown object instances, where the clusters reflect unknown object subclasses. In addition, the panoptic segmentation system can determine additional unknown object instances from an additional digital image. Based on determining similarities between the additional unknown object instances and the unknown object subclasses, the panoptic segmentation system can add one or more of the additional unknown object instances to one or more of the unknown object subclasses. Moreover, in some implementations, the panoptic segmentation system utilizes the unknown object subclasses to refine and tune the panoptic segmentation neural network to improve the detection of unknown object instances in input digital images.

As mentioned above, in various implementations, the panoptic segmentation system determines unknown object instances portrayed within a first set of digital images utilizing a panoptic segmentation neural network. For example, in one or more implementations, the panoptic segmentation system utilizes the panoptic segmentation neural network to identify regional proposals for potential instances (e.g., both object and semantic instances) portrayed in the first set of digital images. The panoptic segmentation system then utilizes the panoptic segmentation neural network to classify the regional proposals to known object classes for recognized object instances and semantic instances or to an unknown object class for unrecognized object instances. In many cases, the panoptic segmentation system classifies multiple object instances (e.g., a subset of object instances) portrayed in the first set of digital images to the unknown object class.

In various implementations, the panoptic segmentation system generates unknown object subclasses. To illustrate, the broad class of unknown object classes can include a variety of different unknown objects that are not typically included in conventional classification regimes (e.g., a unicycle, faucet, or other unlabeled category of objects). The panoptic segmentation system can generate subclasses for these unknown objects that fall within the broader unknown object class, where each unknown object subclass corresponds to a different set of unknown object instances (e.g., one subclass for unicycles another subclass for faucets).

For example, in one or more implementations, the panoptic segmentation system clusters the object instances of the unknown object class into different groups. For some of the clusters or groups, the panoptic segmentation system determines whether to generates a new unknown object subclass for the group. For instance, the panoptic segmentation system determines, based on combined-cluster distances and/or combined-cluster objectness scores, whether a cluster should be assigned a new unknown object subclass. When forming a new unknown object subclass, the panoptic segmentation system can designate the unknown object instances within the cluster as exemplar object instances of the new unknown object subclass.

In one or more implementations, the panoptic segmentation system expands the newly discovered and generated unknown object subclasses with additional exemplar object instances. For example, in some implementations, the panoptic segmentation system utilizes the panoptic segmentation neural network to process a second set of digital images. For unknown object instances portrayed in the second digital image set, the panoptic segmentation system can compare the unknown object instances to the unknown object subclasses to determine similarities. When the panoptic segmentation system determines that an unknown object instance is similar to exemplar object instances within an unknown object subclass, the panoptic segmentation system can add the unknown object instance to the subclass as an additional object instance.

As mentioned above, in some implementations, the panoptic segmentation system refines and/or trains the panoptic segmentation neural network to learn to recognize object instances from the unknown object subclasses. For example, the panoptic segmentation system refines the parameters of the panoptic segmentation neural network utilizing both the known object classes and the newly generated unknown object subclasses. For instance, exemplars in the unknown object subclasses serve as ground truths for classifying object instances within training digital images. In this manner, the panoptic segmentation system greatly improves the ability of the panoptic segmentation neural network to accurately detect a wider number of objects within digital images, including unknown object instances seen during training.

In one or more implementations, the panoptic segmentation system converts an unknown object subclass into a known object class. For example, in some implementations, the panoptic segmentation system determines a label for an unknown object subclass, such as via user input, and reassigns the unknown object subclass to a known object class (e.g., a newly labeled known object class). In various implementations, the panoptic segmentation system trains the panoptic segmentation neural network to segment object instances utilizing the newly labeled class. In some implementations, the panoptic segmentation system relabels detected object instances previously labeled in semantic images with the unknown object subclass label with the new known object class label.

As mentioned previously, in some implementations, the panoptic segmentation system utilizes the trained panoptic segmentation system to inference digital images to generate semantic images. For example, in one or more implementations, the panoptic segmentation system receives an input digital image that includes multiple object instances including unknown object instances. Then, utilizing the panoptic segmentation neural network, the panoptic segmentation system can segment the object instances to known object classes and/or an unknown object subclasses.

As mentioned above, conventional systems suffer from a number of problems with regard to the accuracy and flexibility of computing device operations. For example, regarding accuracy, many conventional systems provide inaccurate image segmentations that fail to detect or classify object instances within digital images. More specifically, many conventional systems do not have annotations or labels for unknown object instances and, thus, fail to accurately detect and/or classify object instances that are portrayed in a digital image. In other cases, conventional systems base their object detection on examples of known images causing objects that are not semantically similar to these known image examples to be missed. Indeed, conventional systems that operate using closed-set annotations are limited in their ability to detect and classify instances within digital images. As a result, these conventional systems are largely unable to accurately classify instances not explicitly learned through training.

In some cases, conventional systems have incorrectly labeled object instances as belonging to a background class. In these cases, the conventional systems inaccurately classify an object instance as part of a segmentation instance, such as a background instance (e.g., grass, sky, road, sand, water, etc.). In other cases, some conventional systems improperly assume that object instances are correctly labeled or available as ground truths when they are not included in the training data. Again, in these cases, these conventional systems provide inaccurate results by failing to properly classify or even detect various object instances.

As mentioned above, many conventional systems are also inflexible. For example, some conventional systems are rigidly limited to closed-set panoptic segmentation when building a panoptic segmentation network. As a result, many conventional systems are prevented from detecting or classifying a wide range of object instances within digital images. Additionally, in many instances, conventional systems require high computational costs to provide output images. In particular, many conventional systems use costly data set construction methods. As a result, these conventional systems utilize limited datasets to save on costs. Because of these limitations, many conventional systems provide lower-quality image segmentation results. Moreover, in many cases, conventional systems are constrained by datasets having domain gaps or different object definitions between datasets, which further limits the ability to detect and classify several object instances within digital images.

In contrast, the panoptic segmentation system can provide numerous advantages and benefits over conventional systems. As described below, in many implementations, the panoptic segmentation system improves accuracy relative to conventional systems. In particular, the panoptic segmentation system provides panoptic segmentation images that are more accurate than conventional systems. For example, the panoptic segmentation system can discover object instances that are not supervised and/or acknowledged during training. Further, in various implementations, the panoptic segmentation system introduces open-set panoptic segmentation, which expands closed-set panoptic segmentation to also discover panoptic segmentation labels of object instances for unknown subclasses during training.

Additionally, in various implementations, the panoptic segmentation system can expand an unknown object subclass. For example, upon generating a subclass of unknown object instances, the panoptic segmentation system can utilize the panoptic segmentation neural network to process additional digital images to identify additional exemplar object instances that are classified to the unknown object subclass. Accordingly, the panoptic segmentation system can add these additional exemplar object instances to the unknown object subclass to increase the overall robustness and accuracy of the panoptic segmentation neural network.

Further, the panoptic segmentation system can continuously improve the discovery of unknown object instances. For example, upon discovering an unknown object subclass that includes multiple similar unknown object instances, the panoptic segmentation system can use the unknown object instances as a pseudo-ground truth for further training and refining the panoptic segmentation neural network. In this manner, the panoptic segmentation neural network can better detect unknown object instances in future input digital images that correspond to one of the discovered unknown object subclasses.

Moreover, with respect to improved accuracy, in various implementations, the panoptic segmentation system can accurately detect unknown object instances that are incorrectly labeled as background classes. For example, in one or more implementations, the panoptic segmentation system dynamically learns to detect and classify unknown object instances that were incorrectly labeled as a background class and correctly add them to an unknown object subclass. Indeed, the panoptic segmentation system can more accurately detect objects and object instances within digital images including object instances not labeled in training.

Further, the panoptic segmentation system can also improve flexibility relative to conventional systems. As mentioned above, rather than being limited to a limited closed-set, the panoptic segmentation system can extend panoptic segmentation to the open-world by facilitating open-set panoptic segmentation. As a result of this flexible extension, the panoptic segmentation system can build a panoptic segmentation neural network that detects and classifies a wider range of object instances within digital images. Indeed, the panoptic segmentation system improves the ability of a panoptic segmentation neural network to detect any object instance seen during training, regardless of whether the object instance belongs to an unknown object class.

As another example, in various implementations, the panoptic segmentation system provides increased flexibility by generating new unknown subclasses made of exemplar object instances based on clustering object features. The panoptic segmentation system can then discover additional exemplar object instances for an unknown object subclass based on comparing additional unknown object instances observed in training to existing unknown object exemplars in the unknown object subclasses.

Further, the panoptic segmentation system can provide improved flexibility of operation to a computing device and/or a field of technology. For example, in various implementations, through extending the panoptic segmentation neural network to utilize open-set panoptic segmentation, the panoptic segmentation system facilitates a wide range of practical applications. For example, the panoptic segmentation system can facilitate improved dataset construction, scene analysis, as well as digital image editing.

In addition, the panoptic segmentation system improves efficiency relative to conventional systems. For instance, in one or more implementations, the panoptic segmentation system utilizes a two-stage iterative process that first discovers unknown object subclasses, expands the unknown object subclasses, then repeats the two stages. In this manner, the panoptic segmentation system can improve training efficiency by discovering several unknown object subclasses early on that can be added to, and used as, ground truths to train the panoptic segmentation neural network. Further, the panoptic segmentation system can continue to discover new unknown object subclasses through the training process.

Further, in some implementations, the panoptic segmentation system allows for active learning to further improve the efficiency of a panoptic segmentation neural network. For example, the panoptic segmentation system can facilitate label discovery of an unknown object subclass, which leads to converting the unknown object subclass into a new known object class that the panoptic segmentation neural network learns to detect in digital images. Moreover, as described above, the panoptic segmentation system can improve efficiency by allowing for a wider range of data sets for training including data sets that are poorly or incorrectly annotated.

Additional detail regarding the panoptic segmentation system will now be provided with reference to the figures. For example, FIG. 1 illustrates a schematic diagram of a digital medium system environment 100 in which a panoptic segmentation system 106 operates in accordance with one or more implementations. As shown in FIG. 1, the digital medium system environment 100 ("environment 100") includes a client device 102 and a server device 108 connected via a network 112. Additional detail regarding these computing devices is provided below in connection with FIG. 10. In addition, FIG. 10 also provides additional detail regarding networks, such as the illustrated network 112.

As shown, the environment 100 includes the client device 102, which includes an image editing system 104 and a panoptic segmentation system 106. In various implementations, the client device 102 is associated with a user (e.g., a user client device). For example, the client device 102 detects input from a user requesting that the panoptic segmentation system generate a panoptic segmentation of a digital image and/or detect instances with a digital image.

By way of context, in one or more implementations, a digital image (or simply "image") includes a digital visual representation of a scene and/or objects. For example, an image includes a digital graphics file that when rendered displays one or more objects or scenes. In various implementations, images are made up of one or more instances including object instances and segmentation instances. Examples of object instances include objects such as cars, cows, pizza, bananas, persons, animals, signs, or trees. Examples of segmented instances include background objects, conceptual objects, or other non-countable parts of a digital image, such as sky, water, roads, skin, or clothing. In one or more implementations, a digital image includes an input digital image (or simply "input image"), object instance image, semantic segmentation image, or panoptic segmentation image.

Additionally, for context, in many implementations, instances include a visual representation of an object, subject, concept, or sub-concept in an image. For instance, in various implementations, an instance refers to a set of pixels in an image that combines to form a visual depiction of an item, article, partial item, component, concept, or element. Indeed, an instance may correspond to a wide range of classes and concepts.

In various implementations, the image editing system 104 implements some or all of the panoptic segmentation system 106. In alternative implementations, the panoptic segmentation system 106 is separate from the image editing system 104. While the image editing system 104 and the panoptic segmentation system 106 are shown on the client device 102, in some implementations, the image editing system 104 and/or the panoptic segmentation system 106 are located remotely (fully or in part) from the client device 102 (e.g., on the server device 108), as further explained below.

The image editing system 104, in general, facilitates the creation, modification, sharing, searching, and/or deletion of digital images. For instance, the image editing system 104 provides a variety of tools related to image creation and editing (e.g., photo-editing). For example, the image editing system 104 provides selection tools and image manipulation tools. Moreover, the image editing system 104 optionally operates in connection with one or more applications to generate or modify digital images including edited semantic layout images, warped images, and refined images. In some instances, the image editing system 104 operates in connection with digital design applications or other image editing applications.

As mentioned above, the image editing system 104 includes the panoptic segmentation system 106. As further provided below, the panoptic segmentation system 106 utilizes machine-learning models (e.g., neural networks) to generate panoptic segmentation images from input digital images. In particular, the panoptic segmentation system builds a panoptic segmentation neural network to discover unknown object subclasses and refine the panoptic segmentation neural network to better detect corresponding unknown object instances in input digital images. As described below, in many implementations, the panoptic segmentation system utilizes clustering and mining operations to generate an improved panoptic segmentation neural network.

For context, a machine-learning model includes algorithms that model high-level abstractions in data by generating data-driven predictions or decisions from the known input data (e.g., training data). Examples of machine-learning models include computer representations that are tunable (e.g., trainable) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include latent Dirichlet allocation (LDA), linear regression models, logistical regression models, random forest models, support vector machines (SVG) models, neural networks, or decision tree models.

For additional context, a neural network, such as the panoptic segmentation neural network, can include a machine learning model having interconnected artificial neurons that communicate and learn to approximate complex functions and generate outputs based on a plurality of inputs provided to the model. For instance, a neural network includes an algorithm (or set of algorithms) that implements deep learning techniques that utilize a set of algorithms to model high-level abstractions in data using training data to tune parameters of the neural network. Examples of neural networks include a convolutional neural network (CNN), residual learning neural network, recurrent neural network (RNN) such as LSTMs, generative adversarial neural network (GAN), single-shot detection (SSD) networks, and/or a combination of multiple neural network types. Further, in various implementations, neural networks encode and/or decode data via one or more encoders and/or decoders to generate image features (e.g., object feature vectors and/or semantic maps) and/or digital images, as further described below.

As shown, the environment 100 also includes the server device 108. The server device 108 includes a panoptic segmentation server system 110. For example, in one or more implementations, the panoptic segmentation server system 110 represents and/or provides similar functionality as described herein in connection with the panoptic segmentation system 106. In some implementations, the panoptic segmentation server system 110 supports the panoptic segmentation system 106 on the client device 102.

In one or more implementations, the server device 108 includes all, or a portion of, the panoptic segmentation system 106. For instance, the panoptic segmentation server system 110 learns parameters for the panoptic segmentation neural network and/or portions thereof. The panoptic segmentation server system 110 then provides the panoptic segmentation neural network with the learned parameters to the client device 102 (e.g., as part of an image editing application). In these instances, the client device 102 (e.g., the panoptic segmentation system 106) can download the panoptic segmentation neural network with the learned parameters from the server device 108 (e.g., the panoptic segmentation server system 110).

In some implementations, the panoptic segmentation server system 110 includes a web hosting application that allows the client device 102 to interact with content and services hosted on the server device 108. To illustrate, in one or more implementations, the client device 102 accesses a web page supported by the server device 108. For example, the client device 102 provides one or more input images to the server device 108, and, in response, the panoptic segmentation server system 110 on the server device 108 generates a panoptic segmentation image that selects both known and unknown instances in the digital image. The server device 108 then provides the panoptic segmentation image to the client device 102 for display and instance selection.

Although FIG. 1 illustrates a particular number, type, and arrangement of components within the environment 100, various additional environment configurations and arrangements are possible. For example, the environment 100 includes any number of client devices. As another example, the server device 108 represents a set of connected server devices. As a further example, the client device 102 may communicate directly with the server device 108, bypassing the network 112 or utilizing a separate and/or an additional network.

Figure 2A:
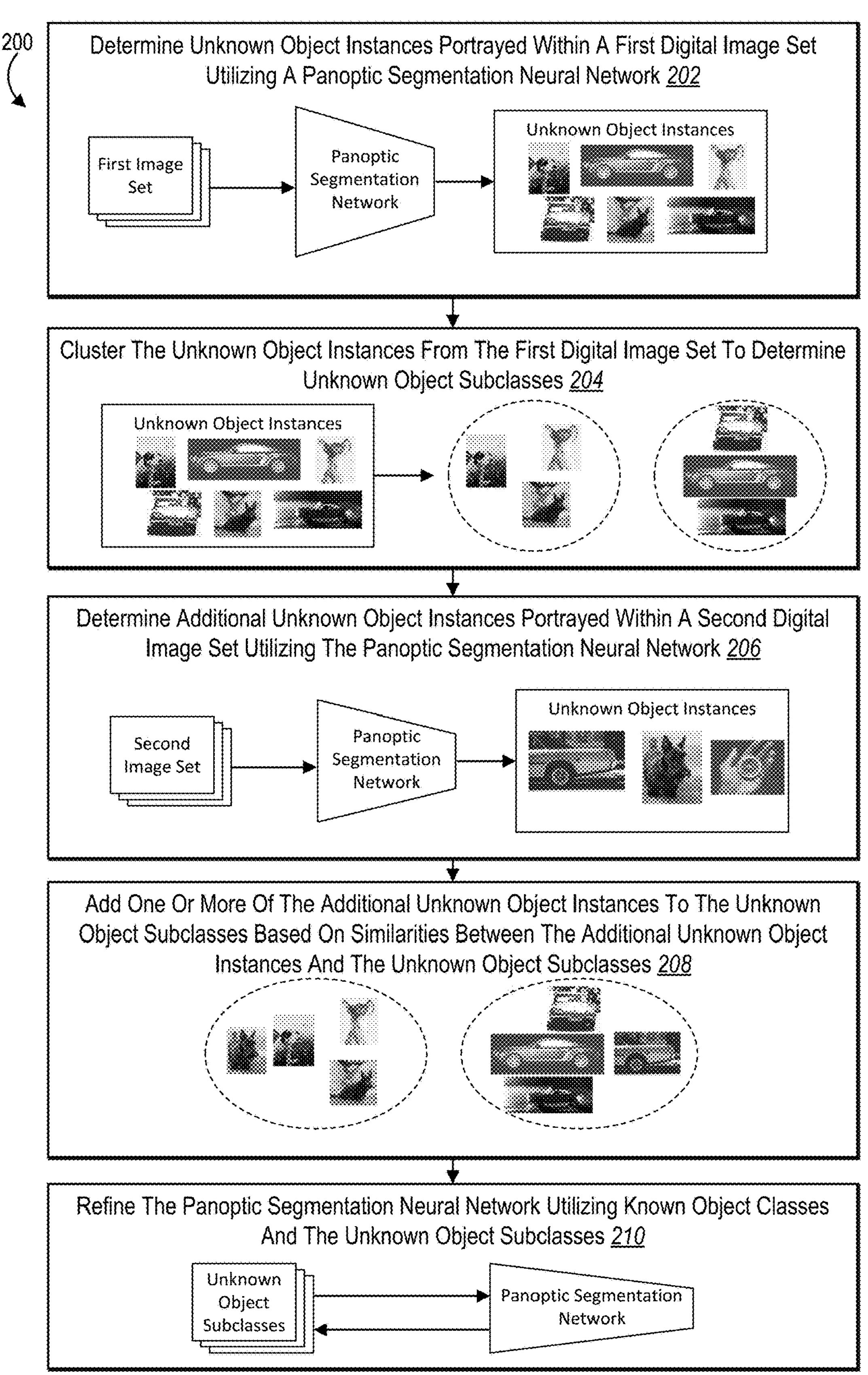
FIGS. 2A-2B illustrate overview flow and block diagrams of generating a panoptic segmentation neural network to discover unknown object subclasses within digital images in accordance with one or more implementations.
Figure 2B:
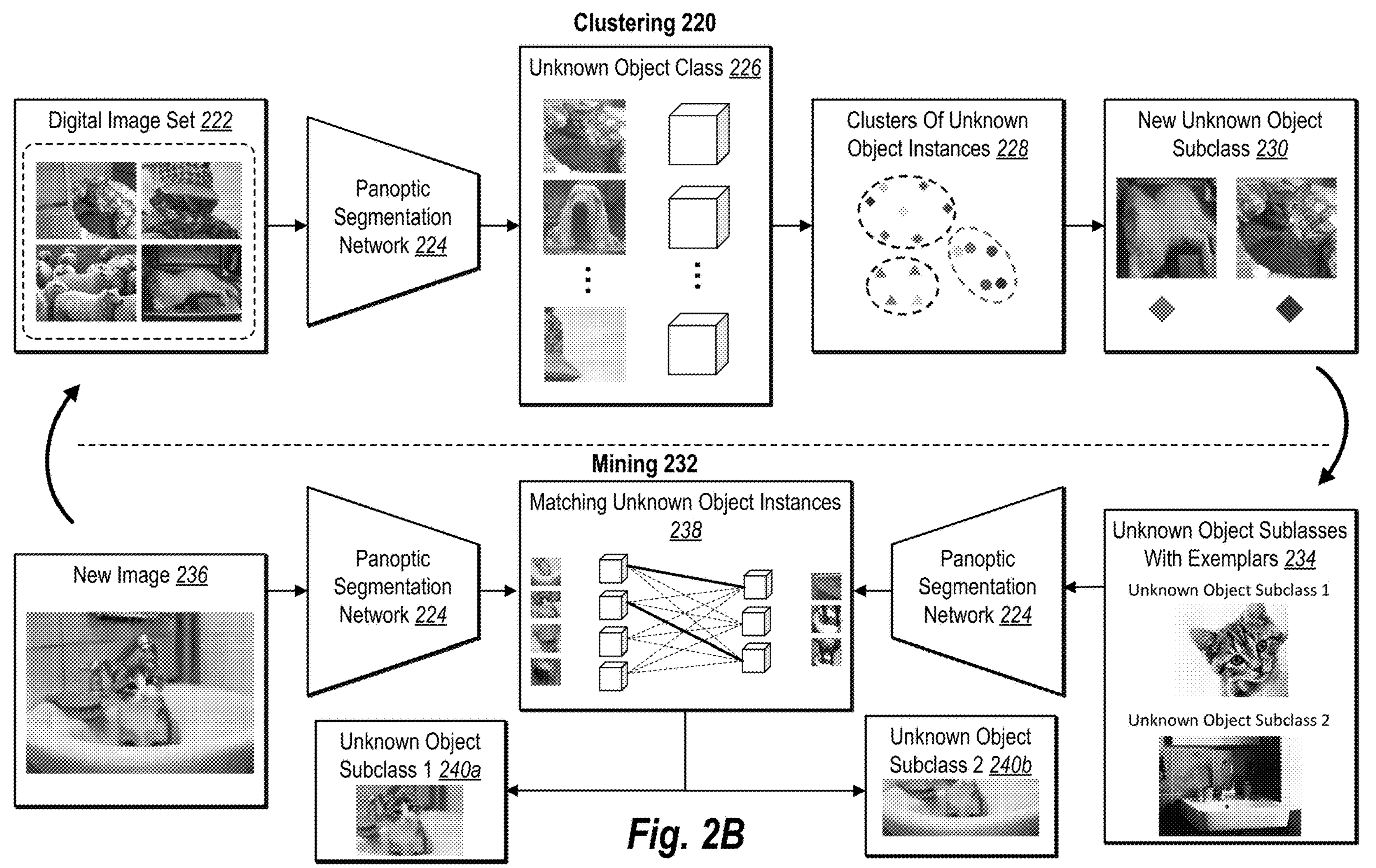

As indicated above, FIGS. 2A-2B illustrate generating a panoptic segmentation neural network that discovers unknown object subclasses within digital images in accordance with one or more implementations. In particular, FIG. 2A illustrates an overview flow diagram and FIG. 2B illustrates an overview block diagram of operations of the panoptic segmentation system 106.

To illustrate, FIG. 2A includes a series of acts 200 performed by the panoptic segmentation system 106 of building a panoptic segmentation neural network that automatically discovers unknown object subclasses in digital images. As shown, FIG. 2A includes the panoptic segmentation system 106 performing an act 202 of determining unknown object instances portrayed within a first digital image set utilizing a panoptic segmentation neural network. For example, in various implementations, the panoptic segmentation system 106 receives a first digital image set, such as a first portion of training images, and utilizes a panoptic segmentation neural network to classify unknown object instances within each of the images into an unknown object class. Additional detail regarding classifying object instances is provided below with respect to FIG. 3A and FIG. 5A.

As shown in FIG. 2A, the panoptic segmentation system 106 also performs an act 204 of clustering the unknown object instances from the first digital image set to determine unknown object subclasses. For example, in one or more implementations, the panoptic segmentation system 106 separates the unknown object instances from the broadly defined unknown object class into more specific subclasses (e.g., unknown object subclasses). Indeed, in various implementations, each unknown object subclass includes a grouping of similar unknown object instances, which serve as exemplar object instances for the subclass. Additional detail regarding clustering and generating unknown object subclasses is provided below with respect to FIGS. 3A-3C.

As illustrated in FIG. 2A, the panoptic segmentation system 106 also performs an act 206 of determining additional unknown object instances portrayed within a second digital image set utilizing the panoptic segmentation neural network. For instance, in one or more implementations, the panoptic segmentation system 106 receives a second set of digital images, such as a second portion of the training data. The panoptic segmentation system 106 can process the second set of digital images utilizing the panoptic segmentation neural network to identify additional unknown object instances.

As shown in FIG. 2A, the panoptic segmentation system 106 also performs an act 208 of adding one or more of the additional unknown object instances to the unknown object subclasses based on similarities between the unknown object instances and the unknown object subclasses. For example, the panoptic segmentation system 106 compares object feature vectors between the additional unknown object instances and the exemplar object instances in the unknown object subclasses. Based on the similarities, the panoptic segmentation system 106 can augment an unknown object subclass with one or more additional unknown object instances that visually fit as exemplar object instances of the subclass. Additional detail regarding comparing object feature vectors and adding additional unknown object instances to unknown object subclasses is provided below with respect to FIG. 4.

Moreover, as shown in FIG. 2A, the panoptic segmentation system 106 also performs an act 210 of refining the panoptic segmentation neural network utilizing known object classes and the unknown object subclasses. For example, in one or more implementations, the panoptic segmentation system 106 continues to train the panoptic segmentation neural network utilizing the object instances with the unknown object subclasses as pseudo-ground-truth images with annotations corresponding to the specific unknown object subclass. In this manner, the panoptic segmentation system 106 builds a panoptic segmentation neural network that robustly discovers object instances seen in the training images (e.g., the digital image sets) regardless of whether the object instances have been previously known and labeled as ground truths. Additional detail regarding refining the panoptic segmentation neural network based on the unknown object subclasses is provided below with respect to FIG. 5B.

In addition, while not shown in FIG. 2A, in various implementations, the panoptic segmentation system 106 can also utilize the trained panoptic segmentation neural network to inference input digital images. For example, given an input digital image, the panoptic segmentation system 106 utilizes the panoptic segmentation neural network to generate a panoptic segmentation image that classifies and segments instances including one or more known object instances, unknown object instances, and/or semantic instances. Additional detail regarding generating panoptic segmentation images from input digital image utilizing the panoptic segmentation neural network is provided below with respect to FIG. 6.

As mentioned above, FIG. 2B illustrates an overview block diagram of generating a panoptic segmentation neural network to discover unknown object subclasses within digital images in accordance with one or more implementations. In particular, FIG. 2B shows a two-stage iterative process that includes clustering 220 and mining 232. In various implementations, the panoptic segmentation system 106 builds a panoptic segmentation neural network 224 by determining unknown object subclasses via clustering 220 based on a first portion of training data, then expanding the unknown object subclasses via mining 232 to include unknown object instance from a second portion of training data. In various implementations, the panoptic segmentation system 106 continues to repeat the two stages of clustering 220 and mining 232 utilizing the remaining training data and/or until the panoptic segmentation neural network 224 is trained, as further described below.

As shown with respect to clustering 220, FIG. 2B includes the panoptic segmentation system 106 providing a digital image set 222 to a panoptic segmentation neural network 224, which generates object feature vectors. Based on the object feature vectors, the panoptic segmentation system 106 can classify object instances as belonging to known object classes (not shown) or an unknown object class 226, as further described below. Notably, for purposes of explanation, it is assumed that images of cats and sinks do not belong to any known object class, and thus, are initially classified to the unknown object class category.

Additionally, in various implementations, the panoptic segmentation system 106 clusters the unknown object instances in the unknown object class into multiple unknown object instances 228. For example, the panoptic segmentation system 106 utilizes a clustering algorithm to generate initial clusters from the object feature vectors of unknown object instances within the unknown object class. As described below, in one or more implementations, the panoptic segmentation system 106 utilizes object distances and/or objectness scores of unknown object instances to determine and/or refine the clusters of unknown object instances 228. In some implementations, the panoptic segmentation system 106 also filters out unknown object instances from a given unknown object cluster, as further described below.

As shown, in one or more implementations, the panoptic segmentation system 106 generates a new unknown object subclass 230 (e.g., an unlabeled known object class) from a cluster of unknown object instances 228. For example, in various implementations, the panoptic segmentation system 106 determines whether to generate a new unknown object subclass from a cluster. Additionally, the panoptic segmentation system 106 can store unknown object instances in an unknown object subclass as an exemplar object instance representing the unknown object subclass.

For context, in many implementations, each unknown object subclass includes a set of object instances that share similar visual attributes and characteristics. For instance, unknown object instances in a given unknown object subclass have similar object feature vectors and/or are located near each other in multidimensional object feature vector space. While the unknown object subclasses may fall within the broader classification of unknown objects, a first unknown object subclass includes a first set of unknown object instances that are distinct from the second set of unknown object instances having a second unknown object subclass. For instance, unknown object instances in a given unknown object subclass have similar object feature vectors and/or are located near each other in multidimensional object feature vector space as well as located further away from unknown object instances belonging to another unknown object subclass.

As shown with respect to mining 232, FIG. 2B includes the panoptic segmentation system 106 utilizing the panoptic segmentation neural network 224 to compare additional unknown object instances to exemplar object instances within the unknown object subclasses 234. To illustrate, in a number of implementations, the panoptic segmentation system 106 generates object feature vectors of the exemplar object instances utilizing the panoptic segmentation neural network 224. As shown in FIG. 2B, the right side of the matching unknown object instances 238 includes unknown object instances from the unknown object subclasses 234 and their corresponding object feature vectors (i.e., shown as boxes).

In addition, the panoptic segmentation system 106 receives a new image 236 and utilizes the panoptic segmentation neural network 224 to generate object feature vectors from any additional unknown object instances determined in the new image 236 (e.g., additional unknown object instances). As shown in FIG. 2B, the left side of the matching unknown object instances 238 includes additional unknown object instances from the new image 236 and their corresponding object feature vectors (i.e., shown as boxes).

Further, in various implementations, the panoptic segmentation system 106 matches the unknown object instances, as shown in the matching unknown object instances 238. In particular, the panoptic segmentation system 106 can match the additional unknown object instances to one or more unknown object subclass based on comparing object feature vectors, as further described below. As shown, the panoptic segmentation system 106 matches the top additional unknown object instance (e.g., the image of a sink) to an exemplar object instance from Unknown Object Subclass 2 (e.g., unlabeled object instances of sinks). Similarly, the panoptic segmentation system 106 matches the second-from-the-top additional unknown object instance (e.g., the image of a cat) to an exemplar object instance from Unknown Object Subclass 1 (e.g., unlabeled object instances of cats). Moreover, as shown, the panoptic segmentation system 106 does not determine a sufficient match between the remaining additional unknown object instances from the new image 236 to any unknown object subclass.

As shown, based on matching the additional unknown object instances to unknown object subclasses, the panoptic segmentation system 106 can select one or more additional unknown object instances to be added to corresponding unknown object subclasses. For example, in one or more implementations, the panoptic segmentation system 106 automatically supplements Unknown Object Subclass 1 with the additional unknown object instance (e.g., the cropped image 240*a* portraying a cat) from the new image 236. Similarly, the panoptic segmentation system 106 can automatically supplement Unknown Object Subclass 2 with the sink image 240*b* from the new image 236, which increases the robustness of the panoptic segmentation neural network 224 by broadening the number, the quality, and the scoring of exemplar object instances of the panoptic segmentation neural network 224.

As described above, upon mining images from training digital image sets (or a portion thereof such as a mini-batch of images), the panoptic segmentation system 106 may continue clustering 220 from training images (from both current and previous batches). Additionally, the panoptic segmentation system 106 can also continue mining 232. In various implementations, the panoptic segmentation system 106 concurrently performs clustering 220 and mining 232. In alternative implementations, the panoptic segmentation system 106 alternates between iterations of clustering 220 and mining 232.

Figure 3A:
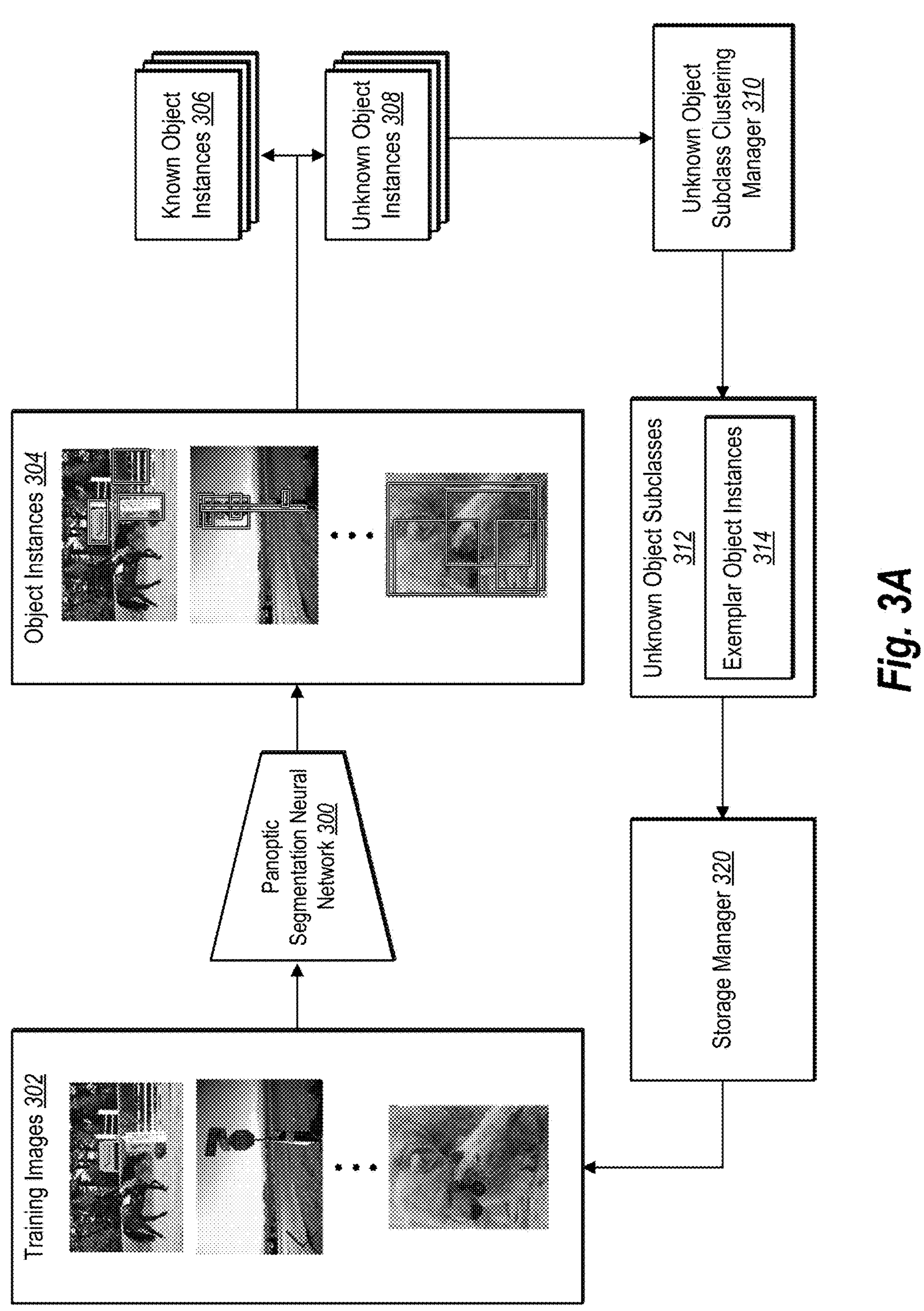
FIGS. 3A-3C illustrate block diagrams of clustering unknown object subclasses in accordance with one or more implementations.
Figure 3B:
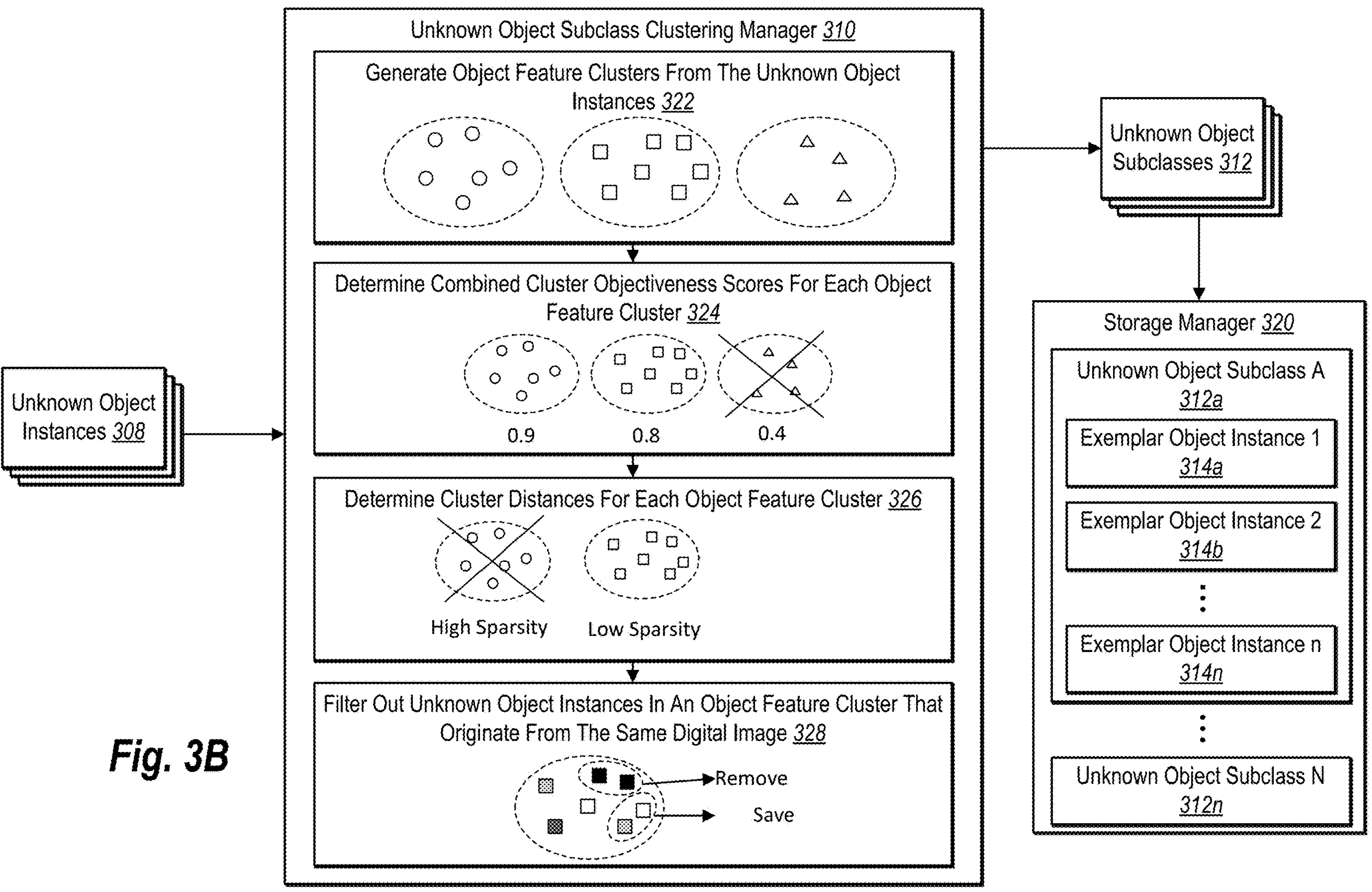
Figure 3C:

Turning to the next figure, FIGS. 3A-3C provides additional detail regarding clustering and generating unknown object subclasses that include exemplar object instances. To illustrate, FIGS. 3A-3C show block diagrams of clustering unknown object subclasses in accordance with one or more implementations. In particular, FIG. 3A illustrates an overview block diagram of clustering unknown object instances into multiple subclasses. FIG. 3B illustrates an expanded block diagram of an unknown object subclass clustering manager shown in FIG. 3A. FIG. 3C illustrates example image results of exemplars clustered into a single unknown object subclass.

As shown, FIG. 3A includes the panoptic segmentation system 106 providing training images 302 to a panoptic segmentation neural network 300 (e.g., the panoptic segmentation neural network 224). In response, the panoptic segmentation neural network 300 detects object instances 304 within the training images 302. In various implementations, the panoptic segmentation neural network generates object feature vectors for each of the detected object instances 304, which includes a string (or map, array or other data structure) of numerical values that represent visual features (e.g., hidden and non-hidden features) of an object instance with a multi-dimensional learned vector space. Additional detail regarding the panoptic segmentation neural network 300 detecting object instances in images, generating object feature vectors, and the architecture of the panoptic segmentation neural network 300 is provided below in connection with FIG. 5A.

As shown, the panoptic segmentation system 106 classifies the detected object instances 304 as either known object instances 306 or unknown object instances 308. In various implementations, the known object instances 306 are classified as various known object classes. The unknown object instances 308 are classified to an unknown object class, which primarily includes object instances for which no known object classification exists. In many implementations, the unknown object class is a single broadly defined unknown object class. The unknown object class can also include various unknown object subclasses (as mentioned above).

FIG. 3A also shows an unknown object subclass clustering manager 310. In one or more implementations, the unknown object subclass clustering manager 310 groups the unknown object instances 308 into clusters as well as determines which clusters should become unknown object subclasses 312 having exemplar object instances 314. Additional detail regarding the unknown object subclass clustering manager 310 generating unknown object subclasses 312 is provided below in connection with FIG. 3B.

As shown, FIG. 3A includes a storage manager 320. In various implementations, the storage manager 320 maintains digital images, such as the training images 302 and/or other training data utilized to train the panoptic segmentation neural network 300. Additionally, in one or more implementations, the storage manager 320 stores the exemplar object instances 314 that belong to the unknown object subclasses 312. For example, for each exemplar object instance 314, the storage manager 320 stores the cropped (e.g., segmented) image of the exemplar object instance, an identifier of the exemplar object instance, and an indication of the unknown object subclass to which the exemplar object instance belongs. Additional detail regarding the storage manager 320 storing exemplar object instances 314 is provided below in connection with FIG. 3B.

In various implementations, as shown, the panoptic segmentation system 106 utilizes the unknown object subclasses 312 stored in the storage manager 320 to supplement training data to include exemplar object instances 314 along with corresponding unknown object subclass labels. In this manner, an unknown object subclass generated in a previous iteration of training can be used to detect similar object instances inferred from the saved exemplars (i.e., exemplar object instances) in later training iteration. Additional detail regarding updating the training data with learned unknown object subclasses 312 is provided below in connection with FIG. 5B.

In some implementations, the panoptic segmentation system 106 utilizes the stored unknown object subclasses 312 to build, train, and/or refine additional machine-learning models. For example, upon processing one or more batches of training images 302, the panoptic segmentation neural network 300 creates multiple unknown object subclasses that target previously unknown object instances. Using these newly generated unknown object subclasses along with the known object classes, the panoptic segmentation system 106 (or another system) can train another machine-learning model to detect and/or segment a wider range of objects than previously possible. Stated differently, by utilizing the unknown object subclasses, an object detection system can identify many more objects than previously possible because the unknown object subclasses provide classification information for a wider range of object types including many that were previously unclassified in training data sets.

As mentioned previously, FIG. 3B shows the unknown object subclass clustering manager 310 in greater detail. For context, FIG. 3B also includes the unknown object instances 308, the unknown object subclasses 312, and the storage manager 320 previously introduced above in connection with FIG. 3A. In particular, the unknown object subclass clustering manager 310 includes a series of acts that the panoptic segmentation system 106 may perform to generate the unknown object subclasses 312 from the unknown object instances 308. In various implementations, the series of acts make up some or part of an object feature clustering algorithm that the panoptic segmentation system 106 utilizes to generate one or more unknown object subclasses 312.

As shown, the unknown object subclass clustering manager 310 includes an act 322 of the panoptic segmentation system 106 generating object feature clusters from the unknown object subclass. As shown in connection with the act 322, the panoptic segmentation system 106 generates three clusters (drawn as dashed lines) around three groups of unknown object instances (drawn as different shapes). In one or more implementations, the panoptic segmentation system 106 clusters object instances utilizing K-means clustering or another clustering process. For example, the panoptic segmentation system 106 utilizes K-means clustering to group the object instances into different clusters or groups based on the respective cosine distance of the object feature vectors of the object instances.

In various implementations, the panoptic segmentation system 106 generates clusters of unknown object instances based on objectness scores (e.g., how closely a potential object is visually like known objects). To illustrate, in one or more implementations, the panoptic segmentation system 106 determines an objectness score for each unknown object instance (e.g., candidate proposals that have unknown classifications or non-known object classifications) utilizing a region proposal network. The region proposal network may be part of the panoptic segmentation neural network 300 in some implementations and separate from the panoptic segmentation neural network 300 in other implementations. In one or more implementations, the panoptic segmentation system 106 utilizes a region proposal network to determine objectiveness scores, as described in S. Ren et al., *Faster R-CNN: Towards Real-Time Object Detection With Region Proposal Networks*, published in NeurIPS, 2015, the entirety of which is incorporated herein by reference.

In some implementations, the panoptic segmentation system 106 determines an objectness score utilizing an object detection model. For example, an object detection model evaluates the unknown object instance to determine whether the unknown object instance resembles an object. In some instances, the object detection model compares features of the unknown object instance to features of known objects, patterns, and/or shapes to determine an objectness score. In other instances, the object detection model compares the outline or color of the unknown object instance to those of known objects to determine an objectness score. In some instances, the object detection model utilizes a machine-learning algorithm to determine an objectness score for an unknown object instance.

For unknown object instances that include an objectness score that meets or exceeds an objectness score threshold, the panoptic segmentation system 106 includes the clusters. In some implementations, the panoptic segmentation system 106 selects an objectness score threshold of 0.9 out of a scale from 0-1. In additional implementations, to select high-quality clusters, the panoptic segmentation system 106 linearly increases the objectness score threshold depending on the number of object feature clusters having an objectness score threshold of 0.99.

In some implementations, the panoptic segmentation system 106 first selects unknown object instances that are primarily included in a void region (e.g., a region where pixels do not correspond to known objects). For example, for each identified unknown object instance, the panoptic segmentation system 106 determines if at least 50% or more of the pixels fall within a void region (e.g., are unlabeled or not classified to a known object class). In this manner, the panoptic segmentation system 106 ensures that the unknown object instance does not belong to, or is not a part of, a known object instance. Indeed, if over half (or another threshold amount such as 65%) of the bounding box region around an unknown object instance belongs to an unknown object class, the panoptic segmentation system 106 can avoid duplicate detection. In a number of implementations, the panoptic segmentation system 106 avoid duplicate detection by applying a Non-Maximum Suppression (NMS) with the IoU threshold $1\times10^{-7}$ before sampling candidate proposals (i.e., unknown object instances) with the weights based on their objectness scores, as described above.

In various implementations, the panoptic segmentation system 106 initially generates a large number of clusters. For example, in one or more implementations, the panoptic segmentation system 106 over-clusters by generating a large number of clusters (e.g., up to 128 clusters). In these implementations, the clusters may include noisy unknown object instances due to the conservative clustering approach. However, by over-clustering, the panoptic segmentation system 106 provides a better opportunity to discover a wider range of unknown object instance types. In alternative implementations, the panoptic segmentation system 106 generates fewer clusters.

As shown, the unknown object subclass clustering manager 310 includes an act 324 of the panoptic segmentation system 106 determining combined cluster objectiveness scores from each object feature cluster. In one or more implementations, the panoptic segmentation system 106 determines a mean or an average objectiveness score for each cluster. For example, the panoptic segmentation system 106 averages the objectiveness score of each unknown object instance included in a cluster. In alternative implementations, the panoptic segmentation system 106 utilizes other approaches to determine the combined objectiveness score of a cluster, such as a weighted sum or a root sum square.

In various implementations, the panoptic segmentation system 106 compares the combined cluster objectiveness score (e.g., an average-cluster objectiveness score) to a cluster objectiveness score threshold. For example, if the combined cluster objectiveness score is below the objectiveness score threshold, then the panoptic segmentation system 106 discards the cluster along with its unknown object instances. Indeed, clusters having lower combined cluster objectiveness scores often include large amounts of noise rather than good exemplars. For instance, these clusters often include unknown object instances that are non-objects or partial objects belonging to a larger known object instance.

For clusters having a combined cluster objectiveness score that satisfies a cluster objectiveness score threshold, the panoptic segmentation system 106 can keep or maintain the cluster as a potential unknown object subclass. To illustrate, as shown in connection with the act 324, the panoptic segmentation system 106 removes the third cluster having a combined cluster objectiveness score of 0.4 while keeping the first and second clusters having combined cluster objectiveness scores of 0.9 and 0.8, respectively.

As shown, the unknown object subclass clustering manager 310 includes an act 326 of the panoptic segmentation system 106 determining cluster distances for each object feature cluster. In one or more implementations, the panoptic segmentation system 106 determines a combined-cluster object distance score for each cluster based on the distance between each unknown object instance in the cluster and a central point of the cluster. For example, in various implementations, the panoptic segmentation system 106 determines a combined-cluster object distance score for a cluster based on the average cosine distance score between the centroid and the elements (e.g., unknown object instances) within the cluster. In some implementations, the panoptic segmentation system 106 determines the distance in object feature vector space.

Clusters having a tightly clustered group of unknown object instances will result in a higher combined-cluster object distance score. In general, multiple unknown object instances portraying the same type of object will result in a tightly formed cluster. In contrast, non-objects (e.g., non-object proposals such as background portions) or partial objects generally form a sparser cluster (e.g., have looser connections) and produce a lower combined-cluster object distance score.

To illustrate further filtering out sparse and noisy clusters, in various implementations, the panoptic segmentation system 106 compares the combined-cluster object distance score for each cluster to a cluster object distance threshold. For example, if the combined-cluster object distance score for an object feature cluster is below a cluster object distance threshold of 0.025, the panoptic segmentation system 106 marks the object feature cluster as having high sparsity and/or removing the cluster from consideration as an unknown object subclass. Otherwise, if the combined-cluster object distance score for an object feature cluster is at or above the cluster object distance threshold, the panoptic segmentation system 106 maintains the object feature cluster. As shown in connection with the act 326, the panoptic segmentation system 106 removes the high sparsity object feature cluster.

As shown, the unknown object subclass clustering manager 310 includes an act 328 of the panoptic segmentation system 106 filtering out unknown object instances in an object feature cluster that originate from the same digital image. In various implementations, the panoptic segmentation system 106 discards unknown object instances in a cluster that originate from the same digital image. Often, two unknown object instances from the same image can represent noise added to an object feature cluster.

As shown in connection with the act 328, the squares in the object feature cluster represent unknown object instances having similar visual features. Additionally, the shading of the squares represents the image from which an image originates. Accordingly, as shown, the panoptic segmentation system 106 removes the two unknown object instances (top right black squares) that originate from the same digital image.

In various implementations, the panoptic segmentation system 106 stores the object feature cluster as an unknown object subclass represented by the unknown object instance serving as exemplars (e.g., exemplar object instances). For example, the panoptic segmentation system 106 stores the remaining cropped images of the unknown object instances as exemplars of the newly generated unknown object subclass.

In one or more implementations, the panoptic segmentation system 106 selects highly coupled unknown object instances as examples to save to memory. For example, the panoptic segmentation system 106 stores two or more unknown object instances that are within a threshold paring distance of another unknown object instance (e.g., a cosine distance of 0.15 or less). As shown, in connection with the act 328, the panoptic segmentation system 106 stores the pair of unknown object instances in the lower right of the object feature cluster as exemplars of the unknown object subclass. In this manner, the panoptic segmentation system 106 generates high-quality exemplars to represent the unknown object subclass.

As shown in FIG. 3B, the panoptic segmentation system 106 stores the unknown object subclasses 312 with the storage manager 320. For example, in various implementations, the panoptic segmentation system 106 stores corresponding object proposals in memory with a new class label $u_n+1$, where n is the number of found unknown classes. In these implementations, the exemplar object instances in memory serve a pseudo-ground-truths (e.g., cropped digital images with labels of "Unknown Object Subclass A"). In this manner, a new class $u_n+1$ is added to the unknown class set, $U=\{u_1, u_2, \ldots, u_n\}$.

To illustrate, the storage manager shows Unknown Object Subclass A 312*a* having Exemplar Object Instance 1 314*a*, Exemplar Object Instance 2 314*b*, . . . , Exemplar Object Instance n 314*n*. Accordingly, for each unknown object instance remaining in a cluster after the filtering actions described above, the panoptic segmentation system 106 stores these unknown object instances as exemplars (e.g., Exemplar Object Instance 1-*n* 314*a*-*n*), Exemplar Object Instance 2 314*b*, . . . , Exemplar Object Instance n 314*n* located in a corresponding unknown object subclass (e.g., Unknown Object Subclass A 312*a*). If the unknown object subclass currently exists from previous iterations of training, the panoptic segmentation system 106 can add the newly discovered unknown object instances to the unknown object subclass as additional exemplars.

In various implementations, the panoptic segmentation system 106 performs the series of acts shown within the unknown object subclass clustering manager 310 (or a portion of the acts) regularly. For example, the panoptic segmentation system 106 performs the series of acts after 200-250 iterations (or another number of iterations such as 100 or 400, etc.). In this manner, the panoptic segmentation system 106 enables a number of unknown object instances to be detected before generating object feature clusters and unknown object subclasses.

As mentioned above, FIG. 3C illustrates example image results of exemplars clustered into a single unknown object subclass. In particular, FIG. 3C shows cropped portions of digital images 316 that show cars detected in a set of images. For context, object instances having the annotations of "car" were removed from a set of digital images and these images were provided to the panoptic segmentation neural network 300 during training. As shown, the panoptic segmentation system 106 detected object instances and initially classified them as unknown object instances. The panoptic segmentation system 106 then clustered these unknown object instances together, determined that the object feature cluster satisfied both a combined objectness score threshold and an average-distance score threshold.

As described above, utilizing the remaining unknown object instances of the object feature cluster, the panoptic segmentation system 106 generates a new unknown object subclass and provided the unknown object instances (i.e., the cropped portions of digital images 316) as exemplar object instances representing the new unknown object subclass. As shown, the cropped portions of digital images 316 include various cropped images that are very similar to each other (e.g., tightly coupled unknown object instances).

Figure 4:
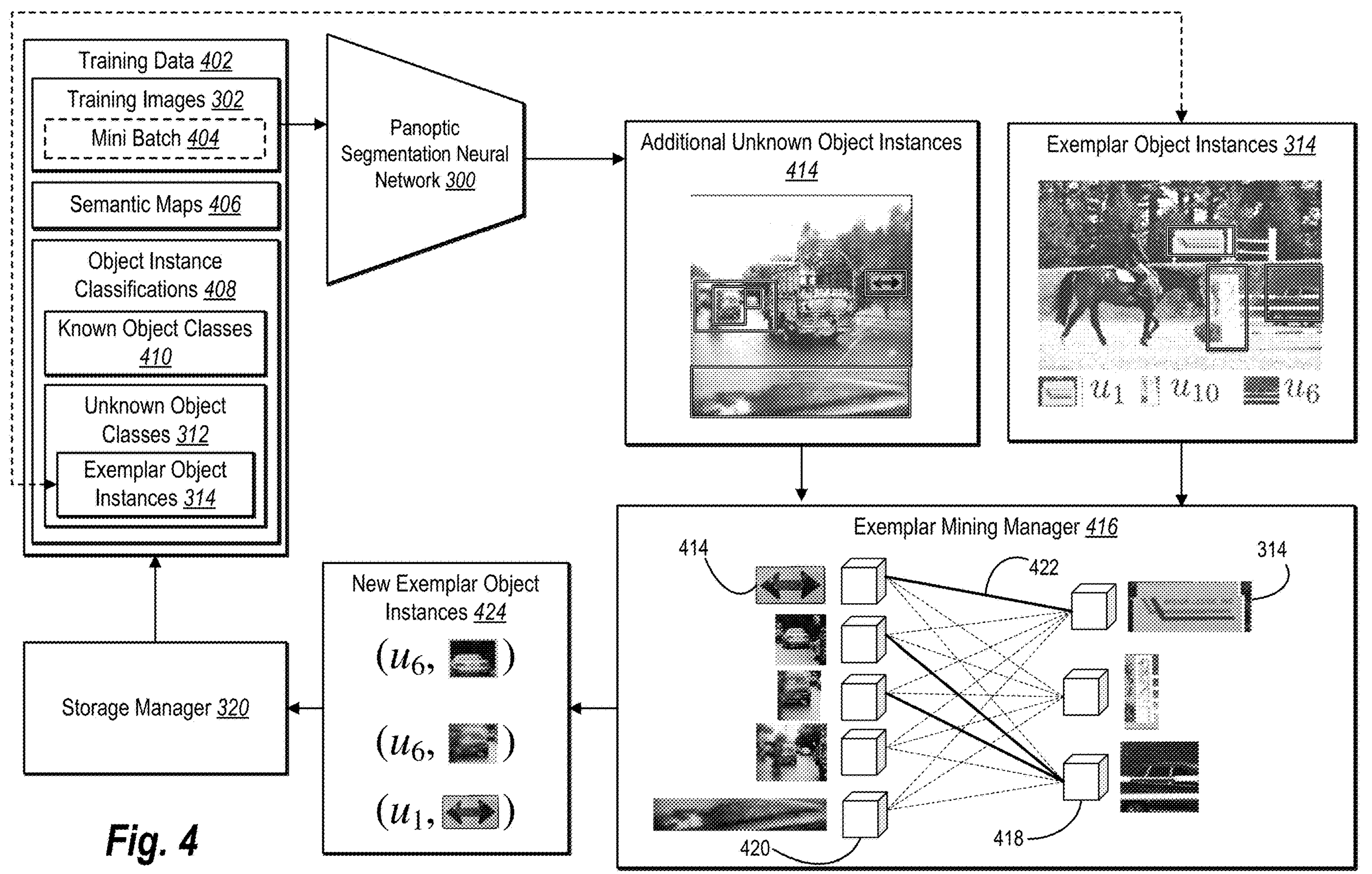
FIG. 4 illustrates a block diagram of mining unknown object subclasses in accordance with one or more implementations.

Turning now to FIG. 4, additional detail is provided regarding comparing object feature vectors and adding additional unknown object instances to unknown object subclasses. In particular, FIG. 4 illustrates a block diagram of mining unknown object subclasses in accordance with one or more implementations.

For example, FIG. 4 illustrates training data 402, the panoptic segmentation neural network 300, the exemplar object instances 314, additional unknown object instances 414, an exemplar mining manager 416, and the storage manager 320. Additionally, the training data 402 includes the training images 302, semantic maps 406, and object instance classifications 408 having known object classes 410 and the unknown object subclasses 312.

As mentioned above, the training images 302 may be part of the training data 402 that includes corresponding ground truth data, such as semantic maps 406 indicating semantic labels for each of the training images 302 as well as object instance classifications 408 annotating (e.g., labeling) known object instances portrayed in the training images 302. As also shown, the object instance classifications 408 include the unknown object subclasses 312 previously generated by the panoptic segmentation system 106 and/or stored in memory, as described above. In some implementations, the unknown object subclasses 312 include exemplar object instances maintained as cropped images and/or object feature vectors.

As shown, the panoptic segmentation system 106 provides the training data 402 to the panoptic segmentation neural network 300 for building and refining the panoptic segmentation neural network 300. For example, as described above, the panoptic segmentation system 106 provides the training images 302 to the panoptic segmentation neural network 300. In various implementations, the panoptic segmentation system 106 provides the training images 302 in multiple portions or batches. For instance, FIG. 4 shows that the training images 302 include mini-batches 404, such as batches of 200-250 training images. In various implementations, the panoptic segmentation system 106 processes each of the training images 302 in a mini-batch before performing additional actions such as clustering or mining.

To illustrate, in one or more implementations, the panoptic segmentation system 106 provides a mini-batch 404 of training images 302 to the panoptic segmentation neural network 300 for processing. As shown, the panoptic segmentation neural network 300 generates additional unknown object instances 414 and/or corresponding object feature vectors. In particular, the bounding boxes within the training image represent the various additional unknown object instances 414. As described above, the panoptic segmentation neural network 300 detects object instances in a training image 302 (e.g., potential object instances having an objectness score that satisfies an objectness threshold) and, based on being unable to classify the object instances to a known object class, the panoptic segmentation neural network 300 classifies the object instances as unknown object instances.

As shown, FIG. 4 also includes the exemplar object instances 314. In particular, FIG. 4 shows an image of a horse having three exemplar object instances 314 labeled as $u_1$, $u_{10}$, and $u_6$. For this example, $u_n$ refers to unknown object subclass n, meaning each illustrated exemplar object instance is from a different unknown object subclass. While the exemplar object instances 314 are shown as part of the same digital image for purposes of explanation, in many implementations, the exemplar object instances 314 are separately stored as a cropped image within their respective unknown object subclass.

In various implementations, the panoptic segmentation system 106 accesses the exemplar object instances 314 from the training data 402 and/or memory. In one or more implementations, the panoptic segmentation system 106 retrieves previously generated exemplar object feature vectors for the exemplar object instances 314. In some implementations, the panoptic segmentation system 106 utilizes the panoptic segmentation neural network 300 to generate updated exemplar object feature vectors for the exemplar object instances 314. For instance, because the panoptic segmentation neural network 300 is continually refining throughout training (e.g., to incorporate the newly added unknown object subclasses 312), the panoptic segmentation system 106 utilizes a refined panoptic segmentation neural network (e.g., or a region proposal network portion) to generate updated exemplar object feature vectors for the exemplar object instances 314.

Upon determining the additional unknown object instances 414, the panoptic segmentation system 106 can determine whether a correlation exists between the additional unknown object instances 414 and the unknown object subclasses 312. If so, the panoptic segmentation neural network 300 can reclassify an unknown object instance from the unknown object class to a recognized unknown object subclass (e.g., an unlabeled known object class).

To determine a correlation between the additional unknown object instances 414 and the unknown object subclasses 312, in one or more implementations, the panoptic segmentation system 106 utilizes the exemplar mining manager 416. For example, in various implementations, the panoptic segmentation system 106 compares the incoming mini-batch 404 training images 302 to the stored exemplar object instances 314 stored in memory. More specifically, in some implementations, the panoptic segmentation system 106 compares additional object feature vectors 420 from the additional unknown object instances 414 to the exemplar object feature vectors 418 from the stored exemplar object instances 314 to generate cosine similarities 422. If an additional object feature vector 420 has a cosine similarity 422 with an exemplar object feature vector 418 that satisfies a similarity threshold, the panoptic segmentation system 106 can associate the unknown object instances of the additional object feature vector 420 with the unknown object subclass of the exemplar object feature vector 418.

In various implementations, the panoptic segmentation system 106 determines a correlation between the additional unknown object instances 414 and the unknown object subclasses 312 based on comparing individual exemplars (or their corresponding object feature vectors) to an object feature cluster or unknown object subclass. For instance, the panoptic segmentation system 106 determines a distance within the object feature space between the additional unknown object instances 414 and the centroid of the object feature cluster or unknown object subclass. The panoptic segmentation system 106 can then compare the distance to determine whether it satisfies a similarity threshold (e.g., is within a similarity threshold distance).

To illustrate, the exemplar mining manager 416 shows lines indicating cosine similarities 422 between each exemplar object feature vector 418 and each additional unknown object instance 414. As shown, dashed lines indicate cosine similarities 422 that do not satisfy a similarity threshold while solid lines indicate cosine similarities 422 that satisfy the similarity threshold. Additionally, lighter lines show a weaker cosine similarity 422 while darker, heavier weighted lines show a stronger cosine similarity 422.

As shown, the additional unknown object instances 414 include some matches to the exemplar object instances 314 of the unknown object subclasses 312. For example, the additional unknown object instance portraying the business sign is similar to the exemplar object instance that includes a road sign. Similarly, the additional unknown object instances of cars match the exemplar object instance that includes a car. Based on these matches, the panoptic segmentation system 106 can generate new exemplar object instances 424 from the additional unknown object instances 414.

To illustrate, FIG. 4 shows the new exemplar object instances 424 include new exemplar object instances of a first car and a second car being added to the matching unknown object subclass labeled as $u_6$. Additionally, the new exemplar object instances 424 include a new exemplar object instance of a sign being added to the matching unknown object subclass labeled as $u_1$. Notably, because the other additional unknown object instances 414 did not match any of the unknown object subclasses, they were not selected as new exemplar object instances.

As with other exemplar object instances, as shown, the panoptic segmentation system 106 can provide the new exemplar object instances 424 to the storage manager to be stored with other exemplar object instances from their corresponding unknown object subclasses 312, which increase both robustness and accuracy of the panoptic segmentation neural network 300. Additionally, as described above, the panoptic segmentation system 106 can utilize the newly added exemplar object instances to further refine the panoptic segmentation neural network 300 and/or to further mine matching unknown object instances from subsequent training images 302 (e.g., from a future mini-batch).

While FIG. 4 describes mining with respect to unknown object subclasses, in some implementations, the panoptic segmentation system 106 mines exemplar object instances to add to known object classes. For example, as described below, the panoptic segmentation system 106 may convert an unknown object subclass into a known object class upon determining an object label for the unknown object subclass. In these implementations, the panoptic segmentation system 106 can continue to supplement exemplar object instances within the newly converted known object class. Further, the panoptic segmentation system 106 can supplement an existing known object class with corresponding exemplar object instances identified during training.

Figure 5A:
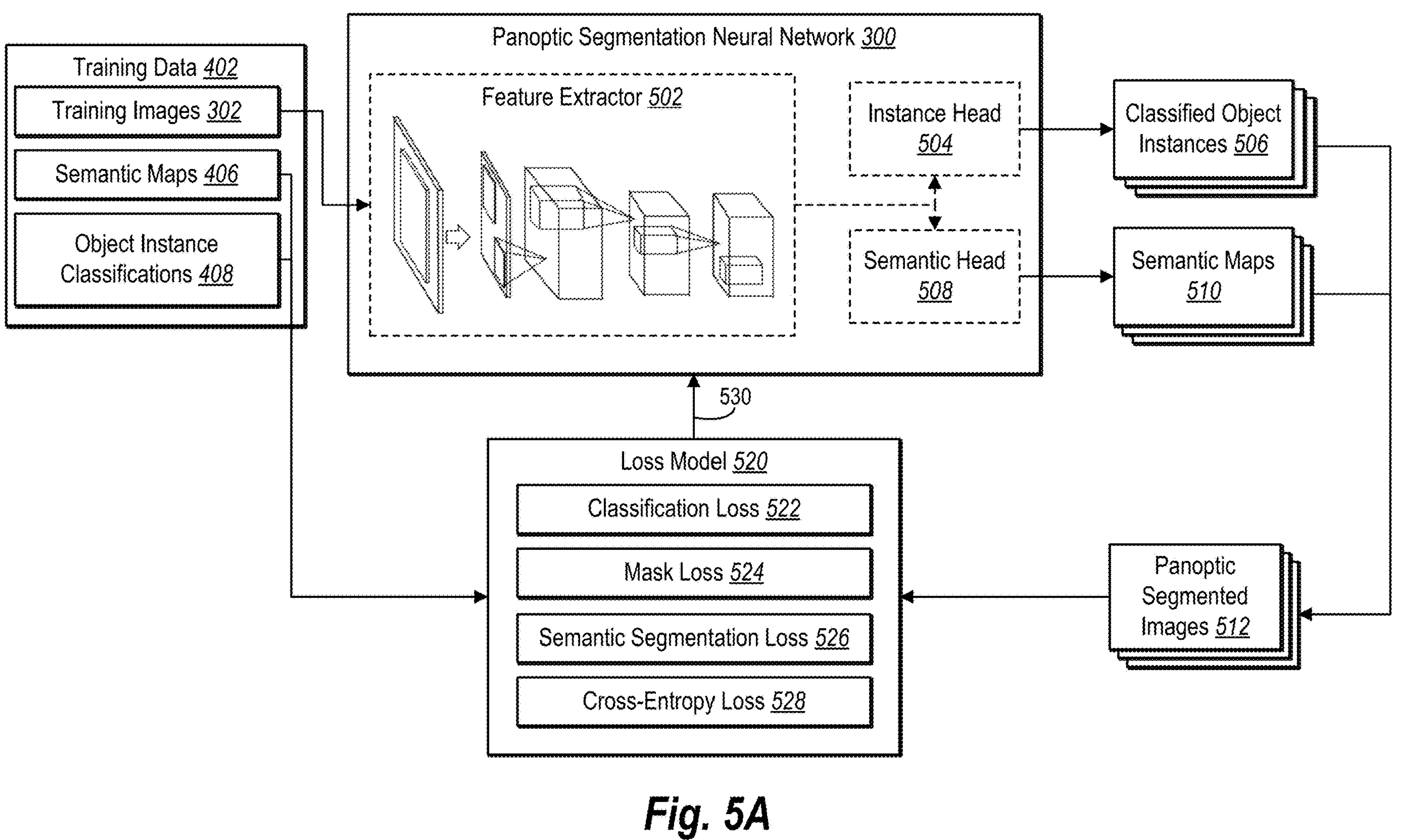
FIGS. 5A-5C illustrate block diagrams of building a panoptic segmentation neural network to discover and classify unknown object subclasses within digital images in accordance with one or more implementations.
Figure 5B:
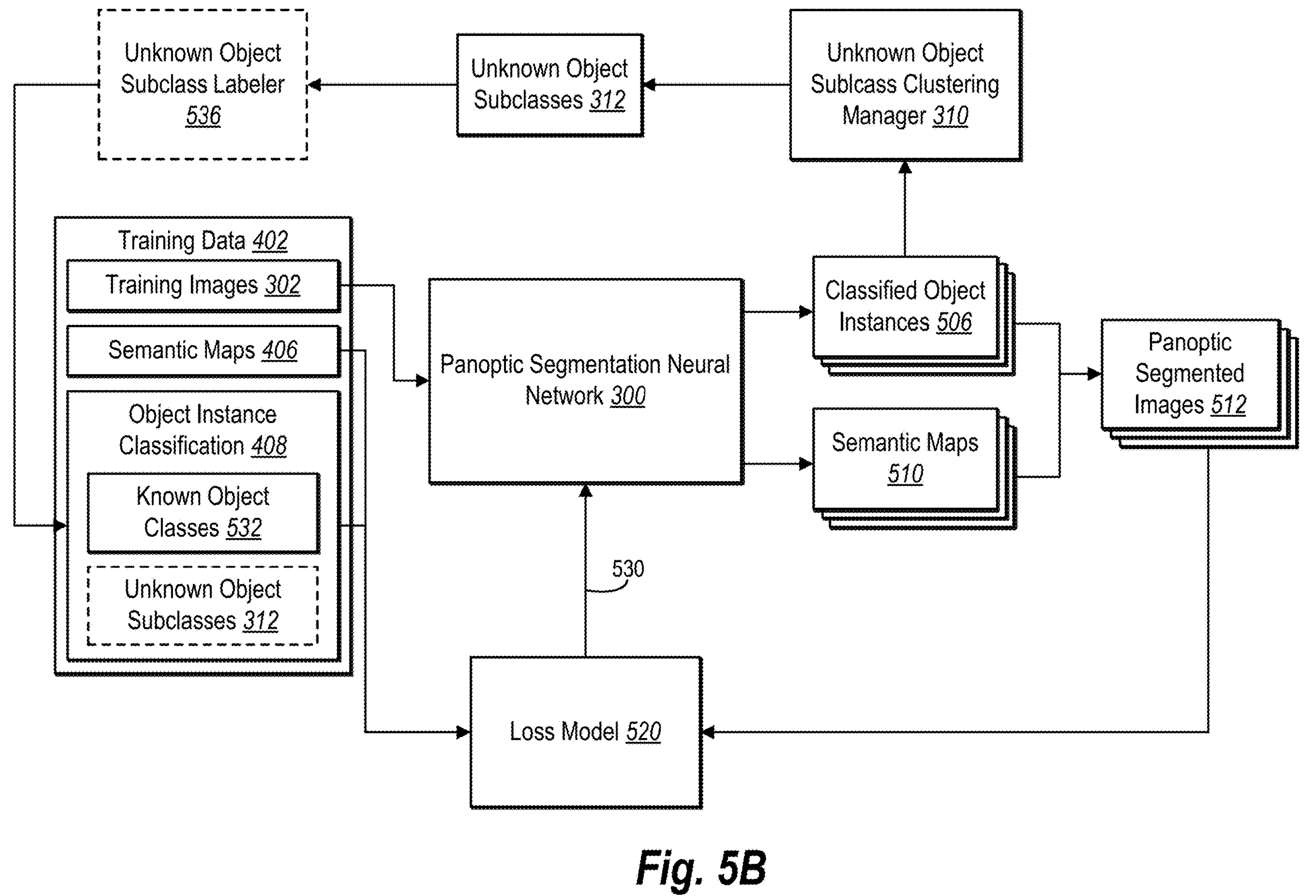
Figure 5C:
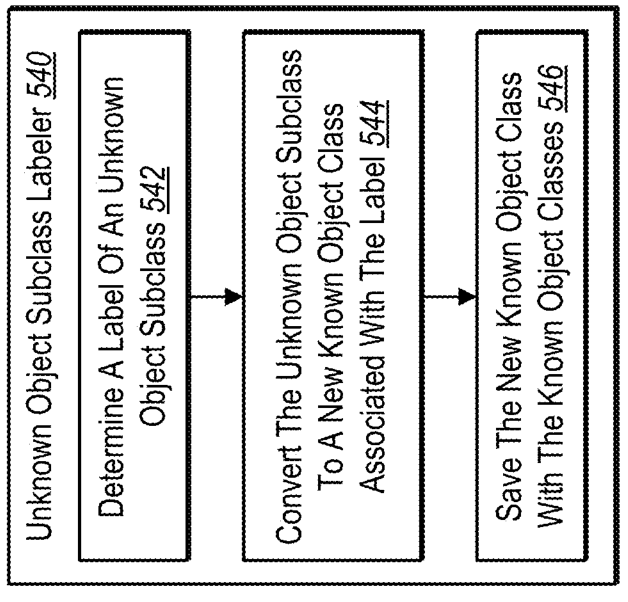

Turning now to FIGS. 5A-5C, additional detail is provided regarding the structure, architecture, and utilization of the panoptic segmentation neural network 300. For instance, FIGS. 5A-5C illustrate block diagrams of building a panoptic segmentation neural network to discover, classify, and segment unknown object subclasses within digital images in accordance with one or more implementations. In particular, FIG. 5A shows the architecture and training of a panoptic segmentation neural network 300, FIG. 5B shows utilizing unknown object subclasses to refine the panoptic segmentation neural network 300, and FIG. 5C shows an unknown object subclass labeler utilized to convert unknown object subclasses into known object classes.

As shown, FIG. 5A includes the training data 402, the panoptic segmentation neural network 300, and a loss model 520. As illustrated, the training data 402 includes the training images 302, the semantic maps 406, and the object instance classifications 408, which are introduced above. As described previously, in various implementations, the panoptic segmentation system 106 utilizes the training data 402 to tune and refine the panoptic segmentation neural network 300.

As shown, the panoptic segmentation neural network 300 includes multiple neural network layers. For example, the panoptic segmentation neural network 300 includes a feature extractor 502, an instance head 504, and a semantic head 508. In various implementations, the feature extractor 502 encodes visual features of digital images (e.g., training images 302) into object feature vectors. In some implementations, the feature extractor 502 corresponds to a shared Feature Pyramid Network (FPN) backbone. Indeed, as shown, the feature extractor 502 provides the object feature vectors to both the instance head 504 and the semantic head 508.

As shown, the instance head 504 (i.e., an instance segmentation head) generates classified object instances 506 including object instances classified as known object classes, an unknown object class, and eventually unknown object subclasses (e.g., unlabeled known object classes). In one or more implementations, the instance head 504 is a decoder that follows the architecture of a mask region-based convolutional neural network (Mask-RCNN). For instance, in one or more implementations, the instance head 504 utilizes a two-stage approach that first generates object proposals for potential object instances (e.g., region proposals approximating the boundaries of potential object instances), then predicts the classification of the object instances). In example implementations, the panoptic segmentation system 106 utilizes large and medium object proposals to improve object detection and performance of the panoptic segmentation neural network 300.

As mentioned above, the panoptic segmentation system 106 utilizes object feature vectors to determine and generate unknown object subclasses. In various implementations, the panoptic segmentation system 106 utilizes an object feature vector for a detected object from the instance head 504. In particular, the panoptic segmentation system 106 obtains an object feature vector from the instance head 504 prior to the classification action. In these implementations, the panoptic segmentation system 106 utilizes the object feature vector to detect an object instance along with a corresponding bounding box.

Additionally, in various implementations, the instance head 504 generates an image mask of the object instance. Moreover, in example implementations, the panoptic segmentation system 106 also performs various operations within the instance head 504, such as aligning regions of interest (RoI-Align) or applying feature computation using two fully-connected layers.

For context, an image mask or mask may include an indication of a plurality of pixels that separates an input image into two or more portions. For instance, a mask includes positive pixels (e.g., a binary value of 1) in areas where an image is to be kept and negative pixels (e.g., a binary value of 0) in areas where the image is to be discarded. For example, in various implementations, the instance head 504 generates classified object instances that include masks of classified object instances.

In various implementations, the panoptic segmentation system 106 modifies the bounding box regressor and/or the mask predictor within the instance head 504 to make handling unknown classes class-agnostic. For example, the panoptic segmentation system 106 utilizes the panoptic segmentation neural network 300 to first predict bounding boxes for object instances pertaining to known object classes. The panoptic segmentation system 106 then has the panoptic segmentation system 106 find unknown object instances based on the objectness scores of the candidate object instances, as described above.

As mentioned above, the panoptic segmentation neural network 300 includes the semantic head 508 (i.e., a semantic segmentation head). In various implementations, the semantic head 508 decodes the object feature vectors generated from the feature extractor 502 of a digital image (e.g., a training image) to generate semantic maps of the digital image. For context, a semantic map includes an image that labels pixels of a digital image (e.g., a training image or an input image) with an object known class or other image classification without discriminating object instances. For example, for a digital image having a person, two dogs, and a background, the semantic layout of the image includes a first semantic group of pixels labeled as "person," a second semantic group of pixels for both dogs labeled as "dog," and a third semantic group of pixels labeled "background."

In one or more implementations, the semantic head 508 follows the architecture of a Feature Pyramid Network (FPN) decoder. In some implementations, the panoptic segmentation system 106 leverages mask-level attention from the instance head 504 to transfer knowledge to the semantic head 508. In some implementations, the panoptic segmentation system 106 utilizes additional and/or different approaches and architecture within the semantic head 508.

As shown in FIG. 5A, the panoptic segmentation system 106 combines the classified object instances 506 with the semantic maps 510 for the training images 302 to generate panoptic segment images 512 (e.g., panoptic mask sets). Indeed, panoptic segment images include both semantic labels as well as object instance classifications for known object classes, and, upon being discovered by the panoptic segmentation system 106, unknown object subclasses (e.g., unlabeled known object class).

In various implementations, the panoptic segmentation system 106 utilizes a top-down approach to panoptic segmentation with respect to the panoptic segmentation neural network 300. For example, in various implementations, the panoptic segmentation system 106 utilizes the panoptic segmentation neural network 300 to first generate object proposals, then segment the object proposals before combining semantic segmentation results to generate the panoptic segment images 512.

As mentioned above, FIG. 5A includes the loss model 520. In various implementations, a loss model (or loss function) includes a function that indicates error amounts (e.g., measures of loss). For instance, in several embodiments, a machine-learning algorithm (e.g., the panoptic segmentation neural network 300) repetitively trains to minimize overall loss. For example, the panoptic segmentation system 106 utilizes the loss model to train the panoptic segmentation neural network 300 in a supervised manner by comparing ground truths (and pseudo-ground truths) from the training data 402 to the panoptic segmented images 512 generated from corresponding training data 402 by the panoptic segmentation neural network 300.

In some embodiments, the panoptic segmentation system 106 utilizes multiple loss functions to minimize overall loss between multiple networks and models. Examples of loss functions include classification loss, mask loss, semantic segmentation loss, cross-entropy loss, pixel loss, perceptual loss, adversarial loss (e.g., discriminator loss), feature matching loss, domain alignment loss, contextual loss, and correspondence distillation loss.

As shown, the loss model 520 includes various losses to train the panoptic segmentation neural network 300. For example, the loss model includes classification loss 522, mask loss 524, semantic segmentation loss 526, and cross-entropy loss 528. As described above, the loss model 520 may utilize additional and/or different loss types.

In one or more implementations, the panoptic segmentation system 106 utilizes the classification loss 522 (including a regression loss), the mask loss 524, and the semantic segmentation loss 526 to train part or all of the panoptic segmentation neural network 300 For example, in some implementations, the panoptic segmentation system 106 applies the loss 530 to the tuning and refining the instance head 504. In various implementations, the panoptic segmentation system 106 utilizes the cross-entropy loss 528 over known classes, a background class, and unknown classes based on the formulation shown in Equation 1 below.

$$\mathcal{L}_{Cross-Entropy} = \sum_{c \in (C^{TH} \cup (bg) \cup \mathcal{U})} -\mathcal{Y}_c \log p_c \quad (1)$$

In Equation 1, $\mathcal{Y}_c$ may represent a (pseudo-)ground-truth label, $p_c$ may represent the SoftMax score of class c, and bg may represent a background class. Additionally, in some implementations, the panoptic segmentation system 106 gives negative supervision to the object instance proposals in void regions (e.g., object proposal areas where less than 50% of the area corresponds to a known object class) to prevent these regions from being classified as known object classes, as shown below in Equation 2.

$$\mathcal{L}_{Void} = \sum_{c \in (C^{Th})} -\log(1 - p_c) \quad (2)$$

In various implementations, the panoptic segmentation system 106 determines the total classification loss 522, as shown in Equation 3 below.

$$\mathcal{L}_{Classification} = \mathcal{L}_{Cross-Entropy} + \mathbb{I}_{Void} \mathcal{L}_{Void} \quad (3)$$

In Equation 3, $\mathbb{I}_{Void}$ may represent an indicator function for an object instance proposal box located in a void region of a digital image being processed by the panoptic segmentation neural network 300.

As mentioned above, FIG. 5B illustrates utilizing unknown object subclasses to refine the panoptic segmentation neural network 300. For example, while FIG. 5A focuses on an example architecture and general training of the panoptic segmentation neural network 300, FIG. 5B provides additional detail regarding refining the panoptic segmentation neural network 300 based on unknown object subclasses discovered during training, as mentioned above.

To illustrate, in FIG. 5B, the training data 402 includes known object classes 532 and the unknown object subclasses 312 located within the object instance classification 408. In addition, FIG. 5B includes the unknown object subclass clustering manager 310 and the unknown object subclasses 312 described above in connection with FIG. 3B. Further, FIG. 5B includes an optional unknown object subclass labeler 536.

As shown, the unknown object subclasses 312 is shown with a dashed lined. In one or more implementations, such as when the panoptic segmentation system 106 begins training the panoptic segmentation neural network 300, the panoptic segmentation system 106 may not have generated any unknown object subclasses 312 having exemplar object instances. However, as training progresses (e.g., in mini-batches), the panoptic segmentation system 106 can begin to add unknown object subclasses 312 to the training data 402 via clustering, as described above in connection with FIGS. 3A-3C. Further, as described above, the panoptic segmentation system 106 can supplement the unknown object subclasses 312 with additional unknown object instances via mining, as described above in connection with FIG. 4.

As shown in FIG. 5B, the panoptic segmentation system 106 provides the training data 402 to the panoptic segmentation neural network 300, which generates classified object instances 506 and semantic maps 510, and which combine to form the panoptic segmentation images 512, as described above. As provided previously, in various implementations, the classified object instances 506 includes a subset of object instances classified as known object classes as well as a subset object instances classified as unknown object instances (e.g., the unknown object class). Further, utilizing the unknown object subclass clustering manager 310, the panoptic segmentation system 106 generates the unknown object subclasses 312 as described above. Moreover, as described above, in various implementations, the panoptic segmentation system 106 stores exemplar object instances of the unknown object subclasses 312 within memory and/or supplements the training data 402 with the unknown object subclasses 312.

In implementations where the training data 402 includes the unknown object subclasses 312, the panoptic segmentation system 106 can train the panoptic segmentation system 106 utilizing pseudo-ground truths from the unknown object subclasses 312. In particular, while the unknown object subclasses 312 lack specific annotations for their respective exemplar object instances (e.g., labeled as "unknown object subclass," "recognized unknown object," etc.), the unknown object subclasses 312 identify exemplar object instances that were previously undiscovered by the panoptic segmentation neural network 300. Accordingly, the panoptic segmentation system 106 can utilize the unknown object subclasses 312 to detect previously undetectable unknown object instances within digital images as well as mark them as belonging to a particular unlabeled object class.

In similar implementations, the panoptic segmentation system 106 can utilize the training approaches described above with respect to the loss model 520 to tune and refine the panoptic segmentation neural network 300 utilizing both the unknown object subclasses 312 and the known object classes 532. Moreover, as the panoptic segmentation system 106 continues to cluster and mine unknown object subclasses 312, the panoptic segmentation system 106 utilizes this data to improve object detection within the panoptic segmentation neural network 300. The improved panoptic segmentation neural network 300, in turn, can then detect unknown object instances not previously detected without the intermediary improvement.

To further illustrate, as mentioned above, in various implementations, the panoptic segmentation system 106 determines whether a potential object instance satisfies an objectness score threshold. As also mentioned above, the objectness score is largely based on objects found in the training data 402. Accordingly, objectness scores are biased against unknown object instances not included in the training data 402 causing unknown object instances to fail in satisfying the objectness score threshold. However, by expanding the pool of object classifications in the training data 402 to include the unknown object subclasses 312, the panoptic segmentation system 106 can more accurately score unknown object instances, resulting in the objectness score threshold being satisfied more often. Indeed, expanding the training data 402 to include exemplar object instances in the unknown object subclasses 312 can result in the panoptic segmentation neural network more accurately detecting all object instances in digital images.

As mentioned above, in some implementations, FIG. 5B includes the unknown object subclass labeler 536. In various implementations, the unknown object subclass labeler 536 enables the panoptic segmentation system 106 to assign a label to one or more unknown object subclasses 312. To illustrate, FIG. 5C shows an expanded example of the unknown object subclass labeler 536. In particular, FIG. 5C shows the panoptic segmentation system 106 performing a series of acts to label unknown object subclasses.

As shown, the series of acts within the unknown object subclass labeler 536 includes an act 542 of the panoptic segmentation system 106 determining a label of an unknown object subclass. For example, in one or more implementations, a user provides input labeling the unknown object subclasses. In some implementations, the panoptic segmentation system 106 provides one or more exemplar object instances in the unknown object subclass to another object detection network or image search model to predict a label for the unknown object subclass. To illustrate, an unknown object subclass includes an exemplar object instance of anteaters. Upon providing one or more of the exemplar object instances to a client device associated with a user, the panoptic segmentation system 106 receives input from the client device indicating a label of "anteaters."

As shown, the series of acts includes an act 544 of the panoptic segmentation system 106 converting the unknown object subclass to a new known object class associated with the label. In particular, the panoptic segmentation system 106 converts the unlabeled known object class (e.g., the unknown object subclass) to a labeled known object class. For context, an unlabeled known object class refers to a known object class that does not specifically identify a particular object type. Rather, an unlabeled known object class refers to a known object class that has a generic or non-descriptive label (e.g., "recognized unknown object," "seen unknown object class," "unidentified known object class," etc.). Continuing the example above, in response to determining the label of "anteaters," the panoptic segmentation system 106 labels the unknown object subclass as "anteaters" as well as the exemplar object instances within the subclass as portraying an anteater.

Additionally, as shown in FIG. 5C, the series of acts includes an act 546 of the panoptic segmentation system 106 saving the new known object class within the known object classes. For example, in one or more implementations, the panoptic segmentation system 106 stores the newly created known object class of anteaters within the training data, as described above. In some implementations, the panoptic segmentation system 106 utilizes the newly created known object class to train another machine-learning model, as described above.

In one or more implementations, the panoptic segmentation system 106 retroactively applies the newly determined label to object instances previously classified to the unknown object subclass. For example, if the unknown object subclass previously assigned the label of "Unknown Object Class 7" to each of its exemplar object instances, then, in various implementations, the panoptic segmentation system 106 replaces this generic label with "Anteater" for each object instance it previously labeled as "Unknown Object Class 7," which can include object instances labeled during inferencing.

In example implementations, the panoptic segmentation system 106 receives additional input for a client device associated with a user. For example, in one or more implementations, the panoptic segmentation system 106 receives input verifying whether an exemplar object instance is correct. In some implementations, the panoptic segmentation system 106 receives input indicating an additional exemplar object instance from which to generate a new unknown object subclass. In these implementations, the panoptic segmentation system 106 can mine additional exemplar object instances to include in the new unknown object subclass.

Figure 6:
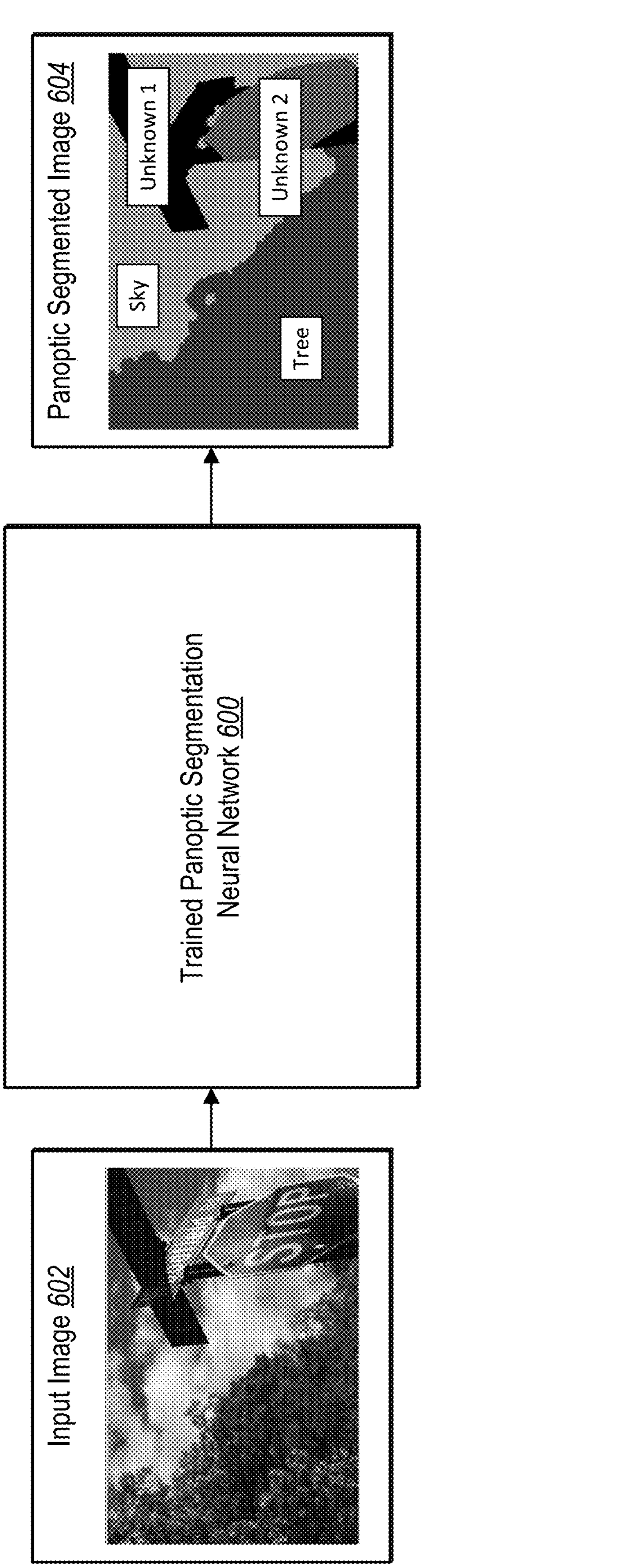
FIG. 6 illustrates a block diagram of utilizing a panoptic segmentation neural network to generate panoptic segmented images in accordance with one or more implementations.

Upon training the panoptic segmentation neural network 300, the panoptic segmentation system 106 is able to generate improved panoptic segmented images from input images. To illustrate, FIG. 6 shows a block diagram of utilizing a panoptic segmentation neural network to generate panoptic segmented images in accordance with one or more implementations. In particular, FIG. 6 includes an input image 602 (i.e., an input digital image), a trained panoptic segmentation neural network 600, and a panoptic segmented image 604.

As shown, the panoptic segmentation system 106 provides the input image 602 to the trained panoptic segmentation neural network 600. In a similar manner as described above, in one or more implementations, the trained panoptic segmentation neural network 600 encodes the input image 602 to generate object feature vectors, then decodes the object feature vectors with a trained instance segmentation head to generate object instance classifications that include both known object classifications and unknown object classifications (e.g., object instances classified to an unknown object subclass). Further, the trained panoptic segmentation neural network 600 utilizes a trained semantic segmentation head to generate a semantic map. Additionally, the trained panoptic segmentation neural network 600 combines the object instance classifications and the semantic map to generate the panoptic segmented image 604.

As also shown, the panoptic segmented image 604 includes semantic labels for background objects, such as the sky. In addition, the panoptic segmented image 604 includes a known object classification for detected objects, such as the trees. Further, the panoptic segmented image 604 includes unknown object classifications for object instances that are detected, but do not yet have labels (e.g., specific labels identifying a particular object type). In particular, as shown, the panoptic segmented image 604 includes the label of "Unknown 1" for street signs and the label of "Unknown 2" for the stop sign. In this manner, even though a specific label is not known for these object instance types, the panoptic segmentation system 106 still segments these object instances that would otherwise go undetected or potentially be grouped as part of the background class.

Figure 7A:
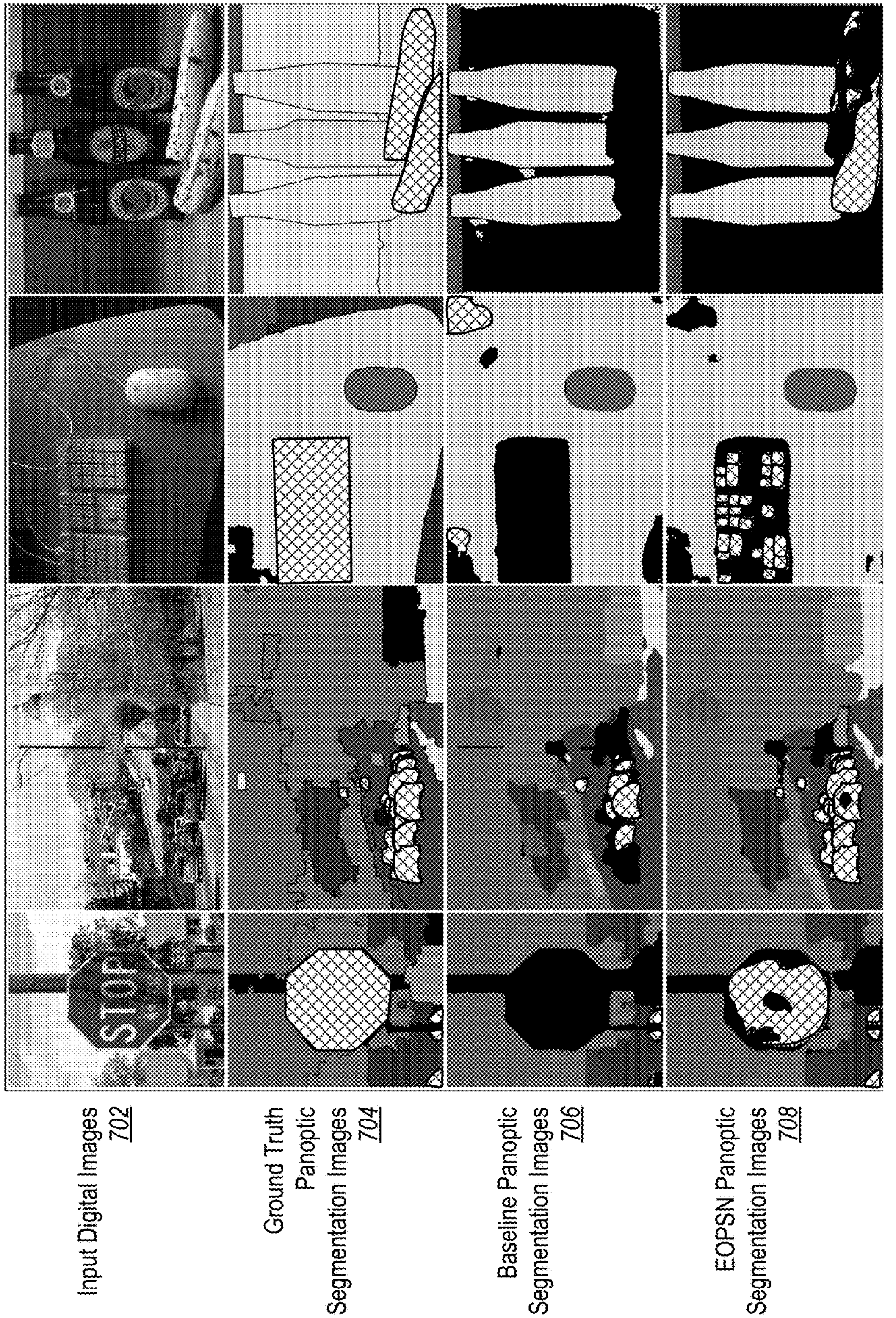
FIGS. 7A-7B illustrate qualitative results of one or more implementations of the panoptic segmentation system in accordance with one or more implementations.
Figure 7B:
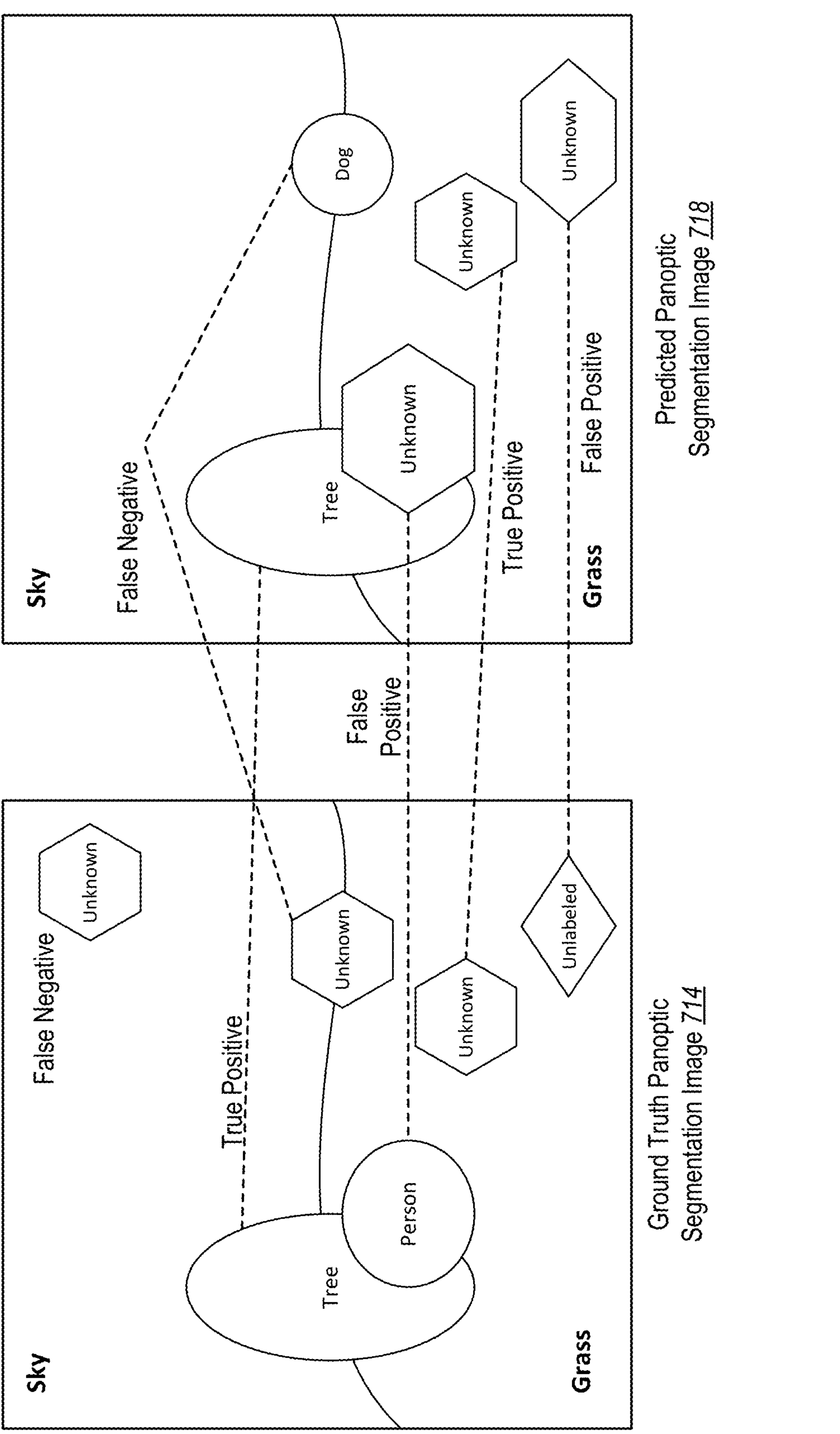

Turning now to the next set of figures, additional detail regarding qualitative and quantitative results of utilizing example implementations of the panoptic segmentation neural network trained by the panoptic segmentation system 106 is provided. In particular, FIGS. 7A-7B illustrate qualitative results of the panoptic segmentation system in accordance with one or more implementations. As shown, FIG. 7A includes a first row of input digital images 702, a second row of ground truth panoptic segmentation images 704, a third row of baseline panoptic segmentation images 706, and a fourth row of EOPSN panoptic segmentation images 708. For context, EOPSN refers to an exemplar-based open-set panoptic segmentation network, which corresponds to an example implementation of the panoptic segmentation neural network 300 disclosed herein.

Because conventional systems do not classify unknown object instances within images, researchers generated a baseline panoptic segmentation model to compare to the panoptic segmentation system 106 and/or the panoptic segmentation neural networks disclosed herein. To elaborate, the baseline panoptic segmentation images 706 corresponds to a baseline panoptic segmentation model. In various implementations, the baseline panoptic segmentation model is a top-down panoptic segmentation model that includes a region proposal network (RPN). In some implementations, the baseline panoptic segmentation model utilizes a panoptic feature pyramid network (FPN), which also includes an instance segmentation head and a semantic segmentation head on top of a shared feature extractor backbone. In one or more implementations, the baseline panoptic segmentation model includes a modified bounding box regressor and/or mask predictor in the instance segmentation head to handle unknown classes in a class-agnostic manner.

In various implementations, the baseline panoptic segmentation model initially predicts bounding boxes pertaining to known classes, then finds unknown object instances based on the objectness scores of the candidate object instance (e.g., based on an objectness score threshold of 0.5). In one or more implementations, the baseline panoptic segmentation model follows the void class condition in the classification branch of the instance segmentation head to identify bounding boxes sampled from the void regions, in a similar manner as described above.

In one or more implementations, the baseline panoptic segmentation model is trained in a supervised manner. For instance, each of the void regions is assigned labels to a new unknown object class. Further, in some implementations, a portion of the known object classes (e.g., 5%, 10%, or 20%) are relabeled as unknown object classes. Stated another way, to construct an open-set setup, annotations and/or exemplar object instances were removed a subset of known thing (e.g., object) classes in the training dataset, such that these object classes because as unknown object instances. The baseline panoptic segmentation model was then trained based on the modified training data set.

Notably, while the baseline panoptic segmentation model includes some similarities to the panoptic segmentation neural network provided above, in many implementations, the baseline panoptic segmentation model does not include the clustering or mining actions disclosed herein. Indeed, while the panoptic segmentation neural network follows an exemplar-based open-set panoptic segmentation network (EOPSN) framework, the baseline panoptic segmentation model follows a simplified open-set panoptic segmentation (OPS) framework.

Returning to FIG. 7A, the second row of ground truth panoptic segmentation images 704 includes images that are segmented by object classification. As described above, a panoptic segmentation image includes labels having both object instance classifications (e.g., object labels) as well as semantic labels (e.g., background labels).

For purposes of simplicity, labels are omitted from the panoptic segmentation images in FIG. 7A and the different segments in a panoptic segmentation image are shaded differently. In addition, areas with a black color indicate non-detected objects in an image (e.g., object instances for which no training data exists). Additionally, the patterned portions correspond to object instances having an object classification belonging to an unknown object subclass. For example, the objects of "stop sign," "cars," "keyboard," and "banana" were relabeled as "unknown objects" to better evaluate the panoptic segmentation models.

As mentioned above, the third row of baseline panoptic segmentation images 706 corresponds to a baseline panoptic segmentation model while the fourth row of EOPSN panoptic segmentation images 708 corresponds to output generated by an example implementation of the trained panoptic segmentation neural network described above. As shown, the EOPSN panoptic segmentation images 708 more accurately detect the unknown object instances while, in most cases, the baseline panoptic segmentation model misses detection of these object instances. Indeed, while the baseline panoptic segmentation model is trained to better detect unknown object instances over conventional panoptic segmentation systems, the baseline panoptic segmentation model also largely fails to discover them. In contrast, the panoptic segmentation neural network disclosed herein successfully (and more accurately) detects and segments unknown object instances missed by the baseline panoptic segmentation model.

In connection with the qualitative results of FIG. 7A, the researchers also performed a number of quantitative evaluations. Prior to providing the quantitative results, a brief discussion of evaluation metrics is first provided. For example, the researchers utilized panoptic segmentation metrics such as panoptic quality (PQ), segmentation quality (SQ), and recognition quality (RQ). Formally, these metrics are defined as shown in Equations 4-6 below.

$$\text{Segmentation Quality (or } SQ) = \frac{\sum_{(p,g)\in TP} IoU(p, g)}{|TP|} \tag{4}$$

$$\text{Recognition Quality (or } RQ) = \frac{|TP|}{|TP| + \frac{1}{2}|FP| + \frac{1}{2}|FN|} \tag{5}$$

$$\text{Panoptic Quality (or } PQ) = SQ \cdot RQ \tag{6}$$

In Equations 4-6, IoU may represent an Intersection-over-Union operation of two regions. TP, FP, and FN may represent true positive, false positive, and false negative, respectively, between ground truth image panoptic segmentation images and panoptic segmentation images generated by the panoptic segmentation neural network (or a baseline panoptic segmentation model).

To provide additional context with respect to true positive (TP), false positive (FP), and false negative (FN) occurrences, FIG. 7B illustrates examples of each of these outcomes. As shown, FIG. 7B includes a ground truth panoptic segmentation image 714 and a predicted panoptic segmentation image 718. Each of the images includes background classes (e.g., sky and grass) and object instances (e.g., tree, person, unknown object instances, and unlabeled object instances). In particular, the ground truth panoptic segmentation image 714 (or simply "ground truth image 714")

includes ground truth panoptic segmentation labels while the predicted panoptic segmentation image 718 (or simply "predicted image 718") includes generated or predicted labels.

As shown, corresponding object instances between the ground truth image 714 and the predicted image 718 are connected with dashed lines (with one exception). Each of these connections indicates a matching result, such as if a match between the corresponding object instances is considered as TP, FP, or FN. To illustrate, FIG. 7B shows a TP match between the tree object instances and a pair of unknown object instances as the predicted image 718 includes the correct object classifications between these objects. When a predicted segment in the predicted image 718 overlaps with a corresponding object instance in the ground truth image 714 by at least an overlapping threshold (e.g., IoU>0.5), then the panoptic segmentation system 106 can identify the segment as a TP match.

Additionally, FIG. 7B shows an FP match between the person object instance in the ground truth image 714 and the unknown object instance in the predicted image 718. Here, the predicted image 718 incorrectly includes an unknown object instance classification for a known object instance, which results in the FP match. Additionally, although the predicted image 718 correctly indicates that the object instance in the bottom right is classified as an unknown object instance, because it is unlabeled in the ground truth image 714, the connection is marked as an FP match for purposes of evaluation.

Further, FIG. 7B shows an FN match between the unknown object instance in the ground truth image 714 and the dog object instance in the predicted image 718. Here, the predicted image 718 incorrectly determines a known object class for the unknown object instance. Moreover, because the predicted image 718 did not detect the unknown object instance shown in the top right of the ground truth image 714, this object instance is also marked as an FN match.

In evaluating the panoptic segmentation models, the researchers followed three assumptions regarding unknown object subclasses observed in training data. First, it was assumed that all unknown object subclasses correspond to the object instances (and not background or "stuff" categories). The second assumption is that unknown object instances are not part of a larger known object. The third assumption is that unknown object classes are limited to appearing in the void regions during training, which further prevents confusion between known and unknown class regions.

Table 2 below summarizes the results of a common training data set (e.g., COCO from T. Lin et al., *Microsoft COCO: Common objects in Context*, published in European Conference on Computer Vision (ECCV), 2014.) with different known-unknown splits between the baseline panoptic segmentation model ("Baseline") to compare to an example of the panoptic segmentation neural network ("EOPSN") disclosed herein. In particular, Table 2 shows open-set panoptic segmentation results on the COCO value set against different known-unknown object class splits (e.g., K %=5%, 10%, and 20%) where K % denotes a ratio of unknown classes to all classes. Additionally, the numbers in bold denote higher scores than the opponents.

TABLE 2

| | | Known | | | Unknown | | |
|---|---|---|---|---|---|---|---|
| K % | Model | PQ | SQ | RQ | PQ | SQ | RQ |
| Supervised Model | | 39.4 | 77.7 | 48.4 | - | - | - |
| 5% | Baseline | 37.7 | 76.7 | 46.4 | 10.0 | 73.8 | |
| | EOPSN | 38.0 | 76.9 | 46.8 | 23.1 | 74.7 | 30.9 |
| 10% | Baseline | 36.9 | 75.4 | 45.5 | 8.5 | 73.2 | 11.6 |
| | EOPSN | 37.7 | 76.8 | 46.3 | 17.9 | 76.8 | 23.3 |
| 20% | Baseline | 36.9 | 76.4 | 45.5 | 7.8 | 73.4 | 10.7 |
| | EOPSN | 37.4 | 76.2 | 46.2 | 11.3 | 73.8 | 15.3 |

In addition, in Table 2, the Supervised Model denotes a Panoptic FPN trained on all known object classes and zero unknown object classes or unknown object subclasses. As shown, the Supervised Model did well with respect to segmenting known object class but could not classify any unknown object instances. Additionally, the EOPSN model outperformed the Baseline model in all aspects for unknown object classes with large margins while still achieving competitive performance for known classes (e.g., the EOSPN scored similarly to the Supervised Model for known object class segmentation). Overall, with respect to both qualitative and quantitative results, examples of the panoptic segmentation system 106 and/or the panoptic segmentation neural networks disclosed herein outperform the baseline panoptic segmentation model as well as conventional systems.

Figure 8:
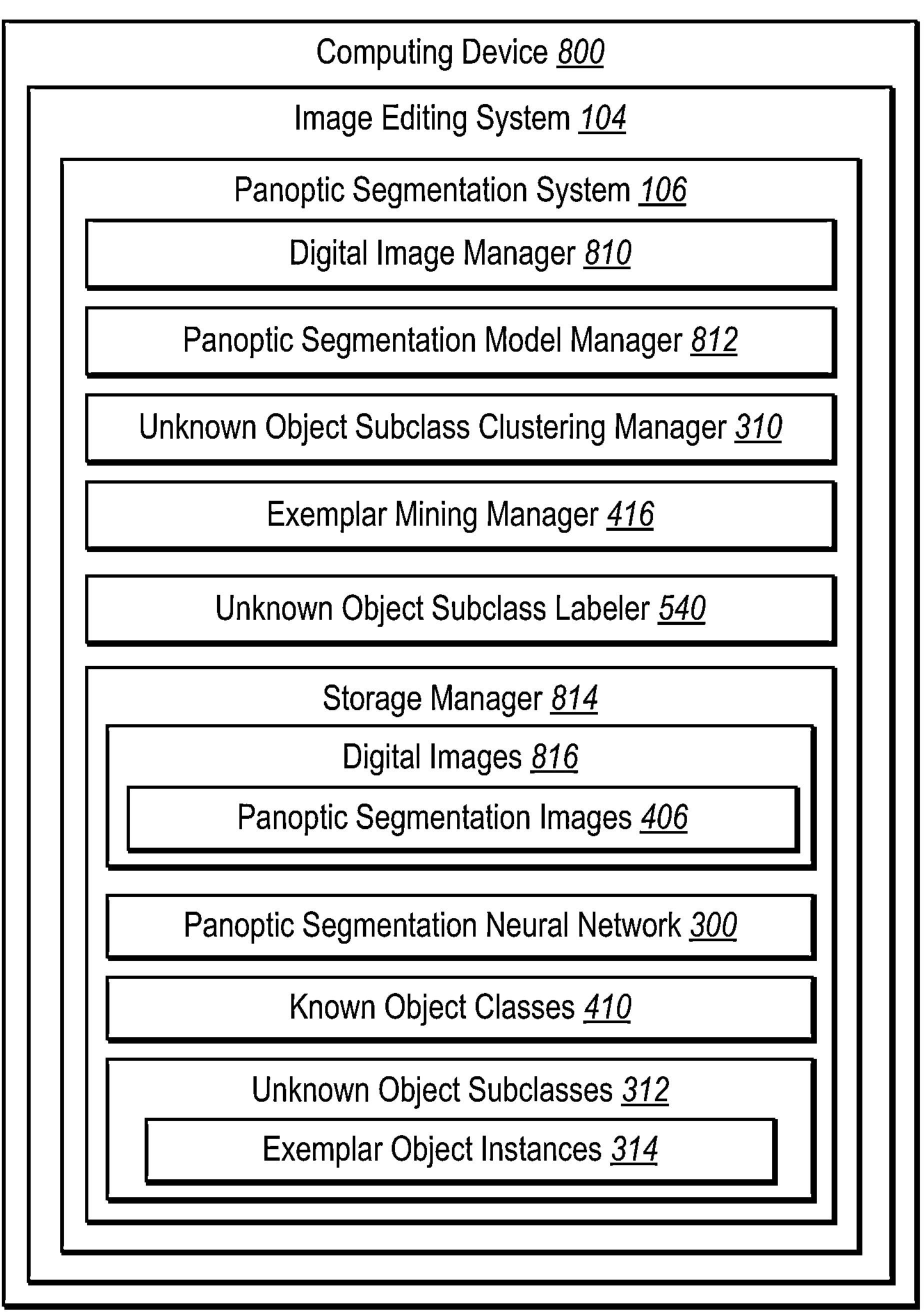
FIG. 8 illustrates a schematic diagram of the panoptic segmentation system in accordance with one or more implementations.

Referring now to FIG. 8, additional detail is provided regarding the capabilities and components of a panoptic segmentation system 106 in accordance with one or more implementations. In particular, FIG. 8 shows a schematic diagram of an example architecture of the panoptic segmentation system 106 implemented within an image editing system 104 and hosted on a computing device 800.

In addition, the computing device 800 may represent various types of computing devices (e.g., the client device 102 and/or the server device 108). For example, in one or more implementations, the computing device 800 is a mobile computing device, such as a laptop, a tablet, a mobile telephone, a smartphone, a wearable device, or a device connected to the internet. In some implementations, the computing device 800 is a non-mobile computing device, such as a server, a cluster of servers, a desktop, or another type of non-mobile computing device. Additional details with regard to the computing device 800 are discussed below with respect to FIG. 10.

As shown, the computing device 800 includes the image editing system 104, which is described above, and the panoptic segmentation system 106. The panoptic segmentation system 106 includes various components for performing the processes and features described herein. To illustrate, the panoptic segmentation system 106 includes a digital image manager 810, a panoptic segmentation model manager 812, an unknown object subclass clustering manager 310, an exemplar mining manager 416, an unknown object subclass labeler 540, and a storage manager 814. As shown, the storage manager 814 includes digital images 816 including panoptic segmentation images 512, a panoptic segmentation neural network 300, known object classes 410, and unknown object subclasses 312 having exemplar object instances 314.

As mentioned above, the panoptic segmentation system 106 includes the digital image manager 810. In general, the digital image manager 810 facilitates identifying, accessing, receiving, obtaining, generating, importing, exporting, copying, modifying, removing, providing, and/or organizing digital images 816. In some implementations, the digital image manager 810 communicates with the storage manager 814 to store and retrieve the digital images 816, for example, within a digital image database or stored in a memory device. As shown, the digital images 816 include panoptic segmentation images 512 generated by the panoptic segmentation system 106 via the panoptic segmentation neural network 300. Additional examples of digital images include input digital images, training images, cropped images of exemplar object instances, and segmentation maps.

As shown, the panoptic segmentation system 106 includes the panoptic segmentation model manager 812. In various implementations, the panoptic segmentation model manager 812 maintains, creates, generates, trains, updates, accesses, and/or utilizes various machine-learning models including one or more neural networks such as the panoptic segmentation neural network 300. For example, the panoptic segmentation model manager 812 trains and tunes the panoptic segmentation neural network 300 to discover unknown object subclasses 312 via clustering as well as expand the unknown object subclasses 312 via mining, as described above.

Further, in some implementations, the panoptic segmentation model manager 812 facilitates the training and use of additional machine-learning models. For example, the panoptic segmentation model manager 812 utilizes known object classes 410 and the newly discovered unknown object subclasses 312 to train one or more object detection machine-learning models.

As shown, the panoptic segmentation system 106 includes the unknown object subclass clustering manager 310. In various implementations, the generates the unknown object subclasses 312 via one or more clustering algorithms. For example, the unknown object subclass clustering manager 310 compares object feature vectors of unknown object instances to generate initial clusters of unknown object instances. In some implementations, the unknown object subclass clustering manager 310 determines and compares cluster distances and cluster objectiveness scores, which are then utilized to determine whether a cluster of unknown object instances should become an unknown object subclass 312, as described above.

As shown, the panoptic segmentation system 106 includes the exemplar mining manager 416. In various implementations, the exemplar mining manager 416 expands an unknown object subclass 312 from a first number of exemplar object instances 314 to a larger number of exemplar object instances. For example, in one or more implementations, the exemplar mining manager 416 detects and matches subsequently detected unknown object instances in digital images 816 (e.g., training images) to the exemplar object instances 314 within an unknown object subclass 312, as described above. Upon determining a sufficient match, the exemplar mining manager 416 adds the new unknown object instances to the unknown object subclass 312 as new exemplar object instances 314.

As shown, the panoptic segmentation system 106 includes the unknown object subclass labeler 540. In various implementations, the unknown object subclass labeler 540 detects labels for unknown object subclass 312. In some implementations, the unknown object subclass labeler 540 detects the label via user input, as previously described. Upon determining a label, in some implementations, the unknown object subclass labeler 540 assigns the label to the unknown object subclass 312 to convert it to a known object class 410.

Each of the components of the panoptic segmentation system 106 shown in FIG. 8 may include software, hardware, or both. For example, the components may include one or more instructions stored on a computer-readable storage medium and executable by processors of one or more computing devices, such as a client device (e.g., a mobile client device) or server device. When executed by the processors, the computer-executable instructions of the panoptic segmentation system 106 may cause a computing device to perform the feature learning methods described herein. Alternatively, the components may include hardware, such as a special-purpose processing device to perform a certain function or group of functions. In addition, the components of the panoptic segmentation system 106 may include a combination of computer-executable instructions and hardware.

Furthermore, the components of the panoptic segmentation system 106 included in FIG. 8 may be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Additionally, the components may be implemented as one or more web-based applications hosted on a remote server. The components may also be implemented in a suite of mobile device applications or "apps." To illustrate, the components may be implemented in an application, including but not limited to ADOBE PHOTOSHOP, ADOBE CREATIVE CLOUD, LIGHTROOM, PHOTOSHOP ELEMENTS, PHOTOSHOP EXPRESS, ADOBE STOCK, or other digital content applications or software packages. The foregoing are either registered trademarks or trademarks of Adobe Inc. in the United States and/or other countries.

FIGS. 1-8, the corresponding text, and the examples provide several different methods, systems, devices, and non-transitory computer-readable media of the panoptic segmentation system 106. In addition to the foregoing, one or more implementations may also be described in terms of flowcharts comprising acts for accomplishing a particular result, such as the flowcharts of acts shown in FIG. 9. Additionally, the acts described herein may be repeated or performed in parallel with one another or parallel with different instances of the same or similar acts.

Figure 9:
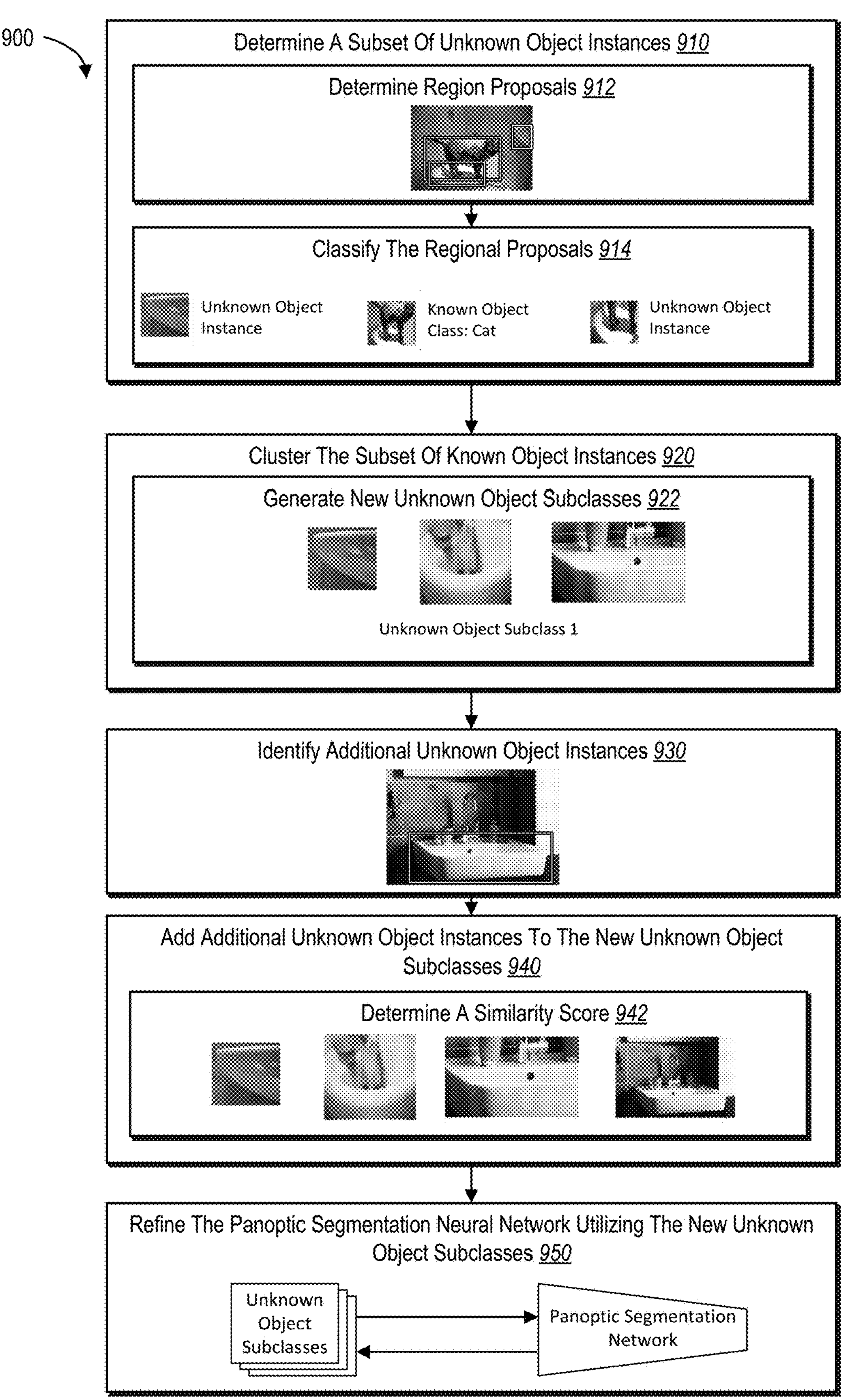
FIG. 9 illustrates a flowchart of a series of acts for generating and utilizing a panoptic segmentation neural network to classify unknown object instances in digital images in accordance with one or more implementations.

While FIG. 9 illustrates acts according to one or more implementations, alternative implementations may omit, add to, reorder, and/or modify any of the acts shown in FIG. 9. The acts of FIG. 9 may be performed as part of methods. Alternatively, non-transitory computer-readable mediums may comprise instructions that, when executed by one or more processors, cause a computing device to perform the acts of FIG. 9. In some implementations, one or more systems may perform the acts of FIG. 9.

As mentioned previously, FIG. 9 illustrates a flowchart of a series of acts 900 of generating and utilizing a panoptic segmentation neural network to classify unknown object instances in digital images in accordance with one or more implementations. In one or more implementations, the series of acts 900 is implemented on one or more computing devices, such as the client device 102, server device 108, or the computing device 800. In addition, in some implementations, the series of acts are implemented in a digital medium environment for editing digital images. For example, the series of acts are implemented on a computing device having memory that includes a first set of digital images, a second set of digital images, and a panoptic segmentation neural network.

As shown, the series of acts 900 includes an act 910 of determining a subset of unknown object instances. In particular, the act 910 may involve determining a subset of unknown object instances portrayed within a set of digital images utilizing a panoptic segmentation neural network that generates a plurality of object feature vectors for the subset of object unknown instances. In some implementations, the act 910 includes generating object feature vectors for the subset of object instances utilizing the panoptic segmentation neural network. In various implementations, the act 910 includes determining a subset of unknown object instances portrayed within a set of digital images utilizing a panoptic segmentation neural network that generates a plurality of object feature vectors for the subset of object unknown instances.

As shown, the act 910 includes multiple sub-acts. For instance, the act 910 includes the sub-act 912 of determining region proposals. In particular, the sub-act 912 may involve determining regional proposals for the plurality of objects in the set of digital images utilizing the panoptic segmentation neural network.

In addition, the act 910 includes the sub-act 914 of classifying the region proposals. In particular, the sub-act 914 may involve classifying the regional proposals utilizing the panoptic segmentation neural network to an unknown object class to determine the subset of unknown object instances. In some implementations, the sub-act 914 includes classifying a subset of object instances into an unknown object class utilizing the panoptic segmentation neural network. In one or more implementations, the sub-act 914 includes segmenting one or more of the regional proposals to the new unknown object subclass.

As shown, the series of acts 900 also includes an act 920 of clustering the subset of known object instances. In particular, the act 920 may involve clustering the subset of object instances of the unknown object class into a plurality of object feature clusters. In some implementations, the act 920 includes determining the combined-cluster object distance score for a first object feature cluster of the plurality of object feature clusters based on averaging the distances between object feature vectors clustered within the first object feature cluster and a centroid of the object feature cluster. In various implementations, the act 920 includes generating a plurality of object feature clusters for the subset of unknown object instances utilizing an object feature clustering algorithm.

As shown, the act 920 includes a sub-act 922 of generating new unknown object subclasses. In various implementations, the sub-act 922 may involve determining a first unknown object subclass and a second unknown object subclass by grouping the subset of unknown object instances utilizing an object feature clustering algorithm and the plurality of object feature vectors for the subset of unknown object instances. In one or more implementations, the sub-act 922 includes determining the first unknown object subclass by generating a plurality of object feature clusters including a first object feature cluster associated with the first unknown object subclass and determining a combined cosine distance between a centroid of the first object feature cluster and object feature vectors clustered in the first object feature cluster. In various implementations, the sub-act 922 includes determining, for a first object feature cluster of the plurality of object feature clusters, a combined-cluster object distance between a centroid of the first object feature cluster and object feature vectors clustered in the first object feature cluster; and comparing the combined-cluster object distance to a cluster object distance threshold.

In some implementations, the sub-act 922 includes determining a plurality of unknown object subclasses based on the plurality of object feature clusters and a plurality of object feature vectors generated from the subset of unknown object instances by the panoptic segmentation neural network. In one or more implementations, the sub-act 922 includes filtering out object feature vectors from the first object feature cluster that are associated with unknown object instances originating from a same digital image within the set of digital images. In alternative implementations, the sub-act 922 includes generating a new unknown object subclass from the plurality of object feature clusters by comparing combined-cluster object distance scores to a cluster object distance threshold and average-cluster objectness scores to a cluster objectness score threshold.

As shown, the series of acts 900 also includes an act 930 of identifying additional unknown object instances. In particular, the act 930 may involve generating an additional object feature vector corresponding to an additional unknown object instance identified from an additional digital image utilizing the panoptic segmentation neural network. For example, in various implementations, the act 930 includes identifying an additional unknown object instance from the second set of digital images utilizing the panoptic segmentation neural network. In some implementations, the act 930 includes generating, utilizing the panoptic segmentation neural network, a plurality of object feature vectors for a subsequent batch of digital images including the additional digital image; determining that additional unknown object instances, which correspond to a subset of the plurality of object feature vectors for the subsequent batch of digital images, correspond to exemplar object instances from the first unknown object subclass; and adding the additional unknown object instances to the first unknown object subclass based on the correspondence.

As shown, the series of acts 900 also includes an act 940 of adding additional unknown object instances to the new unknown object subclasses. In particular, the act 940 may involve adding the additional unknown object instance to the first unknown object subclass based on comparing the additional object feature vector to an exemplar object feature vector corresponding to an exemplar object instance from the first unknown object subclass. In example implementations, the act 940 includes adding the additional unknown object instance to the first unknown object subclass as a new exemplar object instance based on the feature similarity score being greater than an unknown object subclass similarity threshold.

As shown, the act 940 includes a sub-act 942 of determining a similarity score. In some implementations, the sub-act 942 includes augmenting the new unknown object subclass with the additional unknown object instance from the second set of digital images based on the feature similarity score. In various implementations, the sub-act 942 includes determining a feature similarity score between the additional object feature vector and object feature vectors from exemplar object instances in the first unknown object subclass. In one or more implementations, the sub-act 942 includes determining a feature similarity score between the additional unknown object instances and the new unknown object subclass.

In several implementations, the sub-act 942 includes determining the feature similarity score between the additional unknown object instances and the new unknown object subclass based on comparing cosine distances between object feature vectors of the additional unknown object instances and one or more object feature vectors of one or more unknown object instances clustered within the new unknown object subclass.

As shown, the series of acts 900 also includes an act 950 of refining the panoptic segmentation neural network utilizing the new unknown object subclasses. In particular, the act 950 may involve refining parameters of the panoptic segmentation neural network utilizing the first unknown object subclass and the second unknown object subclass. In one or more implementations, the act 950 includes building an object segmentation neural network utilizing a first unknown object subclass of the plurality of unknown object subclasses as a ground truth to classify object instances within digital images. In example implementations, the act 950 includes refining parameters of the panoptic segmentation neural network utilizing a plurality of known object classes and the plurality of unknown object subclasses.

The series of acts 900 may include various additional acts. For example, the series of acts 900 may include acts of receiving an input digital image including a plurality of object instances, segmenting the input digital image utilizing the panoptic segmentation neural network to classify a first object instance of the plurality of object instances to a known class, and segmenting the input digital image utilizing the panoptic segmentation neural network to classify a second object instance of the plurality of object instances to the first unknown object subclass.

In one or more implementations, the series of acts 900 may include acts of converting the new unknown object subclass to a new known object class associated with a label based on determining the label for the new unknown object subclass and building the object segmentation neural network to segment object instances utilizing the new known object class with the label. In various implementations, the series of acts 900 may include an act of regenerating the object feature vectors of unknown object instances in the plurality of unknown object subclasses utilizing the refined panoptic segmentation neural network.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the panoptic segmentation system to generate and utilize the panoptic segmentation neural network, as described herein.

Implementations of the present disclosure may comprise or utilize a special-purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

The computer-readable media may be any available media that is accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure may comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media may include a network and/or data links that are used to carry desired program code means in the form of computer-executable instructions or data structures and that are accessed by a general-purpose or special-purpose computer. Combinations of the above should also be included within the scope of computer-readable media.

Further, upon reaching various computer system components, program code means in the form of computer-executable instructions or data structures may be transferred automatically from transmission media to non-transitory computer-readable storage media (devices) (or vice versa). For example, computer-executable instructions or data structures received over a network or data link may be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) may be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure may also be implemented in cloud computing environments. As used herein, the term "cloud computing" refers to a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud-computing model may be composed of various characteristics such as, for example, on-demand self-service, broad network access, resource pooling, rapid elasticity, measured service, and so forth. A cloud-computing model may also expose various service models, such as, for example, Software as a Service ("SaaS"), Platform as a Service ("PaaS"), and Infrastructure as a Service ("IaaS"). A cloud-computing model may also be deployed using different deployment models such as private cloud, community cloud, public cloud, hybrid cloud, and so forth. In addition, as used herein, the term "cloud-computing environment" refers to an environment in which cloud computing is employed.

Figure 10:
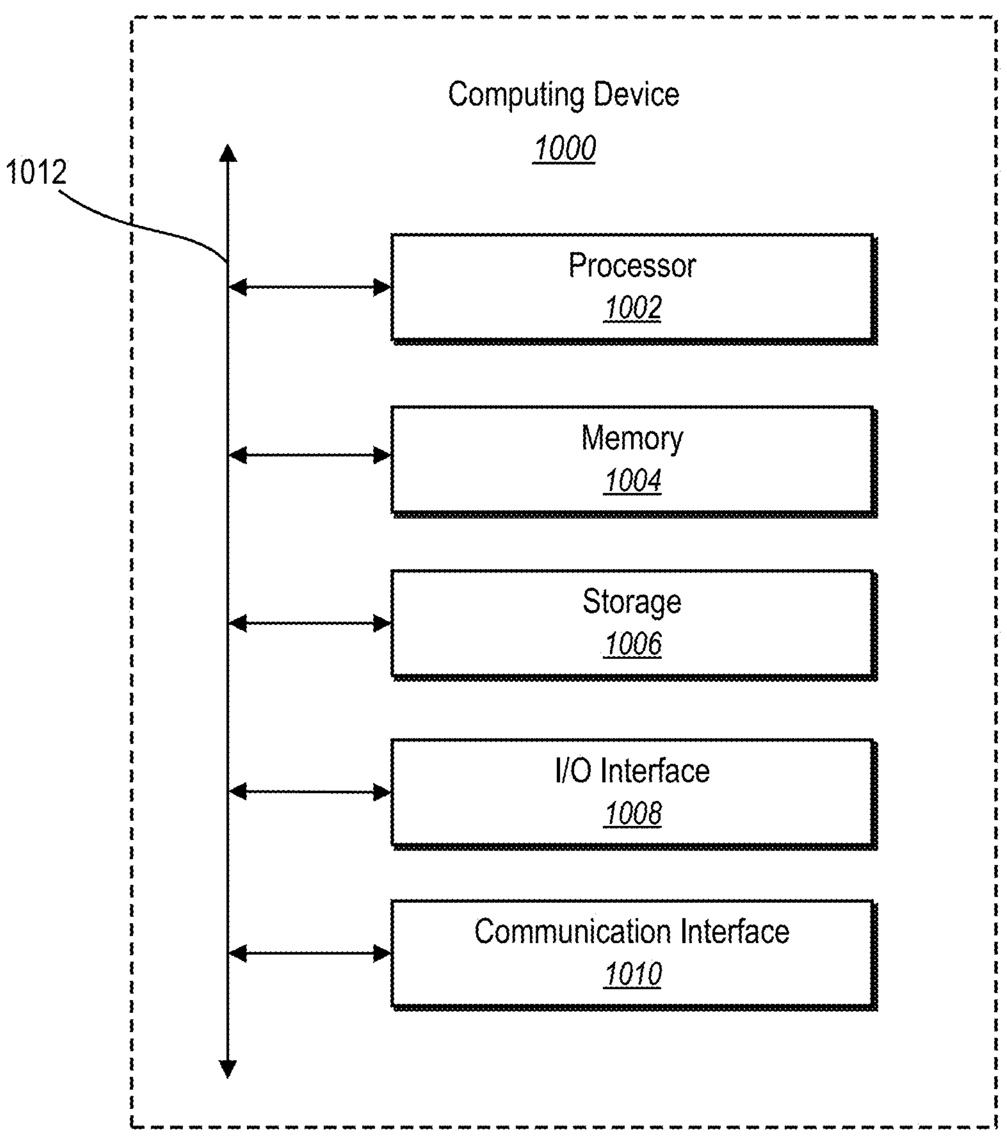
FIG. 10 illustrates a block diagram of an example computing device for implementing one or more implementations of the present disclosure.

FIG. 10 illustrates a block diagram of an example computing device 1000 that may be configured to perform one or more of the processes described above. One will appreciate that one or more computing devices, such as client device 102, server device 108, or the computing device 800. In one or more implementations, the computing device 1000 may be a non-mobile device (e.g., a desktop computer, a server device, a web server, a file server, a social networking system, a program server, an application store, or a content provider). Further, the computing device 1000 may be a server device that includes cloud-based processing and storage capabilities. In some implementations, the computing device 1000 may be a mobile device (e.g., a laptop, a tablet, a smartphone, a mobile telephone, a camera, a tracker, a watch, a wearable device, etc.).

As shown in FIG. 10, the computing device 1000 may include one or more processor(s) 1002, memory 1004, a storage device 1006, input/output ("I/O") interfaces 1008, and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other implementations. Furthermore, in certain implementations, the computing device 1000 includes fewer components than those shown in FIG. 10. Components of the computing device 1000 shown in FIG. 10 will now be described in additional detail.

In particular implementations, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include volatile and/or non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 may include a non-transitory storage medium described above. The storage device 1006 may include a hard disk drive (HDD), flash memory, a Universal Serial Bus (USB) drive, or a combination of these or other storage devices.

As shown, the computing device 1000 includes one or more I/O interfaces 1008, which are provided to allow a user to provide input to (e.g., user strokes), receive output from, and otherwise transfer data to and from the computing device 1000. These I/O interfaces 1008 may include a mouse, keypad, or a keyboard, a touch screen, camera, optical scanner, network interface, modem, other known I/O devices, or a combination of these I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1008 are configured to provide graphical data to a display for presentation to a user. The graphical data may be representative of one or more graphical user interfaces and/or any other graphical content as may serve a particular implementation.

The computing device 1000 may further include a communication interface 1010. The communication interface 1010 may include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 may further include a bus 1012. The bus 1012 may include hardware, software, or both that connects components of computing device 1000 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

receiving, via a client device, a panoptic segmentation request comprising a digital image portraying a plurality of objects;

generating, from the digital image utilizing a panoptic segmentation neural network trained utilizing unknown object instance clusters to classify known object classes and unknown object classes, a panoptic segmented image comprising a semantic map of known labels assigned to a first set of objects and unknown labels assigned to a second set of objects for the plurality of objects; and providing, for display via the client device, the panoptic segmented image with the known labels and the unknown labels for the plurality of objects.

2. The computer-implemented method of claim 1, wherein generating the panoptic segmented image comprises:

generating, utilizing the panoptic segmentation neural network, a first unknown label of a first unknown object class for a first object of the plurality of objects; and generating, utilizing the panoptic segmentation neural network, a second unknown label of a second unknown object class for a second object of the plurality of objects.

3. The computer-implemented method of claim 2, wherein providing the panoptic segmented image for display via the client device further comprises:

providing the first unknown label of the first unknown object class for display with the first object in the panoptic segmented image; and providing the second unknown label of the second unknown object class for display with the second object in the panoptic segmented image.

4. The computer-implemented method of claim 2, wherein the panoptic segmentation neural network is trained to classify the first unknown object class based on a first unknown object class cluster and the second unknown object class based on a second unknown object class cluster.

5. The computer-implemented method of claim 1, wherein generating the panoptic segmented image comprises:

generating, utilizing the panoptic segmentation neural network, a first unknown label instance of a first unknown object class for a first object of the plurality of objects; and generating, utilizing the panoptic segmentation neural network, a second unknown label instance of the first unknown object class for a second object of the plurality of objects.

6. The computer-implemented method of claim 5, wherein providing the panoptic segmented image for display via the client device further comprises:

providing the first unknown label instance of the first unknown object class for display with the first object in the panoptic segmented image; and providing the second unknown label instance of the first unknown object class for display with the second object in the panoptic segmented image.

7. The computer-implemented method of claim 1, wherein providing the panoptic segmented image for display comprises providing a semantic map for display with the known labels and the unknown labels, wherein the semantic map comprises pixel classifications for pixels of the digital image.

8. The computer-implemented method of claim 7, further comprising editing the digital image by selecting and modifying an object of the plurality of objects having an unknown label of the unknown labels according to the pixel classifications of the semantic map.

9. A system comprising:

one or more memory devices; and one or more processors configured to cause the system to:

receive, via a client device, a panoptic segmentation request comprising a digital image portraying a plurality of objects;

generate, from the digital image utilizing a panoptic segmentation neural network trained utilizing unknown object instance clusters to classify known object classes and unknown object classes, a panoptic segmented image comprising a semantic map of known labels assigned to a first set of objects and unknown labels assigned to a second set of objects for the plurality of objects; and provide, for display via the client device, the panoptic segmented image with the known labels and the unknown labels for the plurality of objects.

10. The system of claim 9, wherein the one or more processors are further configured to cause the system to generate the panoptic segmented image by:

generating, utilizing the panoptic segmentation neural network, a first unknown label of a first unknown object class for a first object of the plurality of objects; and generating, utilizing the panoptic segmentation neural network, a second unknown label of a second unknown object class for a second object of the plurality of objects.

11. The system of claim 10, wherein the one or more processors are further configured to cause the system to provide the panoptic segmented image for display via the client device by:

providing the first unknown label of the first unknown object class for display with the first object in the panoptic segmented image; and providing the second unknown label of the second unknown object class for display with the second object in the panoptic segmented image.

12. The system of claim 10, wherein the panoptic segmentation neural network is trained to classify the first unknown object class based on a first unknown object class cluster and the second unknown object class based on a second unknown object class cluster.

13. The system of claim 9, wherein the one or more processors are further configured to cause the system to:

generate the panoptic segmented image by generating, utilizing the panoptic segmentation neural network, a first unknown label instance of a first unknown object class for a first object of the plurality of objects and a second unknown label instance of the first unknown object class for a second object of the plurality of objects; and provide the panoptic segmented image for display by providing, for display, the first unknown label instance of the first unknown object class for display with the first object in the panoptic segmented image and the second unknown label instance of the first unknown object class for display with the second object in the panoptic segmented image.

14. The system of claim 9, wherein the one or more processors are further configured to cause the system to:

provide the panoptic segmented image for display by providing a semantic map for display with the known labels and the unknown labels, wherein the semantic map comprises pixel classifications for pixels of the digital image; and edit the digital image by selecting and modifying an object of the plurality of objects having an unknown label of the unknown labels according to the pixel classifications of the semantic map.

15. A non-transitory computer readable medium storing executable instructions which, when executed by a processing device, cause the processing device to perform operations comprising:

receive, via a client device, a panoptic segmentation request comprising a digital image portraying a plurality of objects;

generate, from the digital image utilizing a panoptic segmentation neural network trained utilizing unknown object instance clusters to classify known object classes and unknown object classes, a panoptic segmented image comprising a semantic map of known labels assigned to a first set of objects and unknown labels assigned to a second set of objects for the plurality of objects; and provide, for display via the client device, the panoptic segmented image with the known labels and the unknown labels for the plurality of objects.

16. The non-transitory computer readable medium of claim 15, wherein generating the panoptic segmented image comprises:

generating, utilizing the panoptic segmentation neural network, a first unknown label of a first unknown object class for a first object of the plurality of objects; and generating, utilizing the panoptic segmentation neural network, a second unknown label of a second unknown object class for a second object of the plurality of objects.

17. The non-transitory computer readable medium of claim 16, wherein providing the panoptic segmented image for display via the client device comprises:

providing the first unknown label of the first unknown object class for display with the first object in the panoptic segmented image; and providing the second unknown label of the second unknown object class for display with the second object in the panoptic segmented image.

18. The non-transitory computer readable medium of claim 16, wherein the panoptic segmentation neural network is trained to classify the first unknown object class based on a first unknown object class cluster and the second unknown object class based on a second unknown object class cluster.

19. The non-transitory computer readable medium of claim 15, wherein the operations further comprise:

generating the panoptic segmented image by generating, utilizing the panoptic segmentation neural network, a first unknown label instance of a first unknown object class for a first object of the plurality of objects and a second unknown label instance of the first unknown object class for a second object of the plurality of objects; and providing the panoptic segmented image for display by providing, for display, the first unknown label instance of the first unknown object class for display with the first object in the panoptic segmented image and the second unknown label instance of the first unknown object class for display with the second object in the panoptic segmented image.

20. The non-transitory computer readable medium of claim 15, wherein the operations further comprise:

providing the panoptic segmented image for display by providing a semantic map for display with the known labels and the unknown labels, wherein the semantic map comprises pixel classifications for pixels of the digital image; and editing the digital image by selecting and modifying an object of the plurality of objects having an unknown label of the unknown labels according to the pixel classifications of the semantic map.

* * * * *